United States Patent [19]
Silverstein et al.

[11] Patent Number: 5,959,711
[45] Date of Patent: Sep. 28, 1999

[54] ENHANCED OFF-AXIS VIEWING PERFORMANCE OF LIQUID CRYSTAL DISPLAY EMPLOYING A FIBEROPTIC FACEPLATE HAVING AN OPAQUELY MASKED FRONT SURFACE ON THE FRONT FACE

[75] Inventors: Louis D. Silverstein, Scottsdale, Ariz.;
Thomas G. Fiske, Campbell, Calif.;
Greg P. Crawford, Providence, R.I.

[73] Assignee: Xerox Corporation, Stamford, Conn.

[21] Appl. No.: 08/761,992

[22] Filed: Dec. 12, 1996

Related U.S. Application Data

[63] Continuation-in-part of application No. 08/473,887, Jun. 7, 1995, abandoned.

[51] Int. Cl.⁶ .................................................. G02F 1/1333
[52] U.S. Cl. ......................................... 349/159; 349/110
[58] Field of Search .............................. 349/64, 104, 110, 349/137, 159

[56] References Cited

U.S. PATENT DOCUMENTS

| | | |
|---|---|---|
| Re. 33,882 | 4/1992 | Morozumi . |
| 2,400,877 | 5/1946 | Dreyer . |
| 2,481,380 | 9/1949 | Anderson, Sr. . |
| 2,544,659 | 3/1951 | Dreyer . |
| 4,017,157 | 4/1977 | Van Riet .............................. 349/159 |
| 4,183,630 | 1/1980 | Funada et al. . |
| 4,344,668 | 8/1982 | Gunther et al. . |
| 4,349,817 | 9/1982 | Hoffman et al. ...................... 349/159 |
| 4,416,514 | 11/1983 | Plummer . |
| 4,486,760 | 12/1984 | Funada et al. . |
| 4,558,255 | 12/1985 | Genovese et al. . |
| 4,669,813 | 6/1987 | Jeskey . |
| 4,735,495 | 4/1988 | Henkes . |

(List continued on next page.)

FOREIGN PATENT DOCUMENTS

| | | |
|---|---|---|
| 0337555 | 10/1989 | European Pat. Off. . |
| 0525755 | 2/1993 | European Pat. Off. . |
| 2136826 | 5/1990 | Japan . |
| 3002723 | 1/1991 | Japan . |
| 6258627 | 9/1994 | Japan . |

OTHER PUBLICATIONS

3M Optical Systems, "3M Brightness Enhancement Film (BEF)", 1993, 2 pages.
Kaiser Optical Systems, Inc., "HoloBrite Diffusion Films", Jan. 1995, 4 pages.
SID 93 Digest, "5.4: Bright and Thin LCD Backlights for Monochrome and Color LCDs", S. Lu, pp. 33–36, 1993.
SID 93 Digest, "19.3: An Optically 'Self–Compensating' Electro–Optical Effect with Wide Angle of View", P. L. Bos et al. pp. 273–276, 1993.
"Passive Optical Phase Retarders for Liquid Crystal Displays", Philip J. Bos, pp. 118–124.
"Twisted Nematic and Supertwisted Nematic Mode LCDs", Terry Scheffer et al., pp. 231–275.

*Primary Examiner*—William L. Sikes
*Assistant Examiner*—Kenneth Parker
*Attorney, Agent, or Firm*—Xerox Corporation

[57] ABSTRACT

A transmissive, backlit color twisted-nematic or super-twisted-nematic liquid crystal display employing a front fiber-optic faceplate or optical equivalent as a front retaining element of a liquid crystal cell that increases viewing angle between the display and a viewer while minimizing or eliminating undesirable variations in luminance, contrast ratio and chromaticity is described. In particular, the fiber-optic faceplate or optical equivalent includes cylindrical optical features and interstitial cladding material. The interstitial cladding material may include an opaque mask blocking layer to prevent the interstitial apertures from diffracting off-axis light into an observer's viewing cone. Further, the interstitial cladding material may be opaque.

11 Claims, 17 Drawing Sheets

U.S. PATENT DOCUMENTS

| | | |
|---|---|---|
| 4,752,806 | 6/1988 | Haas et al. . |
| 4,799,050 | 1/1989 | Prince et al. . |
| 4,851,659 | 7/1989 | Dillon et al. . |
| 4,874,227 | 10/1989 | Matsukawa et al. . |
| 4,904,049 | 2/1990 | Hegg . |
| 4,917,465 | 4/1990 | Conner et al. . |
| 4,987,043 | 1/1991 | Roosen et al. . |
| 5,032,007 | 7/1991 | Silverstein et al. . |
| 5,035,490 | 7/1991 | Hubby, Jr. . |
| 5,050,965 | 9/1991 | Conner et al. . |
| 5,053,765 | 10/1991 | Sonehara et al. . |
| 5,066,512 | 11/1991 | Goldowsky et al. . |
| 5,113,285 | 5/1992 | Franklin et al. . |
| 5,131,065 | 7/1992 | Briggs et al. . |
| 5,159,478 | 10/1992 | Akiyama et al. . |
| 5,181,130 | 1/1993 | Hubby, Jr. . |
| 5,229,872 | 7/1993 | Mumola . |
| 5,245,686 | 9/1993 | Faris et al. . |
| 5,251,280 | 10/1993 | Asada et al. ............................ 385/115 |
| 5,259,057 | 11/1993 | Cook . |
| 5,280,371 | 1/1994 | McCartney, Jr. et al. . |
| 5,329,386 | 7/1994 | Birecki et al. . |
| 5,329,388 | 7/1994 | Yoshimizu ............................ 349/159 |
| 5,329,399 | 7/1994 | Yoshimizu ............................ 349/159 |
| 5,396,351 | 3/1995 | Gessel . |
| 5,510,915 | 4/1996 | Ge et al. ............................... 349/159 |
| 5,521,726 | 5/1996 | Zimmerman et al. ................. 349/159 |
| 5,543,870 | 8/1996 | Blanchard . |
| 5,594,561 | 1/1997 | Blanchard . |
| 5,659,378 | 8/1997 | Gessel . |

ENHANCED OFF-AXIS VIEWING PERFORMANCE OF LIQUID CRYSTAL DISPLAY EMPLOYING A FIBEROPTIC FACEPLATE HAVING AN OPAQUELY MASKED FRONT SURFACE ON THE FRONT FACE

This application is a continuation-in-part of pending U.S. patent application Ser. No. 08/473,887, filed Jun. 7, 1995 by Silverstein et al. and titled "Enhanced Off-Axis Viewing Performance of Liquid Crystal Display Employing a Fiberoptic Faceplate Having Masked Interstitial Apertures," now abandoned.

BACKGROUND OF THE INVENTION

1. Field of the Invention

This invention generally relates to a transmissive, rear-illuminated twisted-nematic (TN) color liquid crystal display (LCD) employing a special front fiber-optic faceplate or optical equivalent that increases the effective viewing angle between the display and a viewer while minimizing undesirable variations in display chromaticity, luminance, and contrast ratio. In particular, the front fiber-optic faceplate or optical equivalent includes masked interstitial apertures or opaque fiber cladding material.

2. Description of Related Art

A conventional, transmissive direct-view color LCD is composed of a source of illumination and a multitude of layered optical elements which each modify the spectral composition of light originating from the source. Moreover, some of these elements, such as polarizers, retardation films and the liquid crystal (LC) layer itself, are optically anisotropic and birefringent layers which produce complex spectral modifications that vary as a function of the material parameters and construction of the LC cell, display voltage (i.e., luminance or gray level), and the direction of light propagation. The predominant LC cell configuration for high-performance color LCDs is the twisted-nematic cell. In the TN cell, incoming light is initially linearly polarized by an entrance polarizer and then the axis of polarization is optically rotated by the LC layer. The rotation of the axis of polarization is mediated by the bifringence and thickness of the LC layer. The typical twist or rotation angle used for most TN LCDs is 90°, although other twist angles may be used to achieve certain desired optical characteristics. After optical rotation by the LC layer, the polarization state of light exiting the LC layer is analyzed by the exit polarizer or "analyzer." Two principle configurations of TN cell entrance and exit polarizers are used, LCDs that utilize crossed polarizers are often called normally-white (NW) mode LCDs while those consisting of parallel polarizers are typically called normally-black (NB) mode LCDs. For both voltage-controlled gray scale and off-axis viewing, the light path through the LC layer "sees" a different birefringence than in the fully voltage-saturated, on-axis situation. This is due to the fact that the angles at which the light path intercepts the anisotropic LC molecules vary as a function of LC cell voltage and viewing angle. This in turn results in different degrees of stimulation of the ordinary and extraordinary modes of the LC causing varying degrees of phase difference between the two polarization components, different polarization states at exit from the LC cell, and resulting variations in light transmission through the exit polarizer. In addition, phase differences between polarization components and resulting variations in light transmission are wavelength dependent, thereby resulting in chromaticity differences as well as intensity or luminance differences. Off-axis viewing adds additional complications due to path length differences through all of the material layers comprising the LCD as well as angle-related reflection and polarization effects at all of the different optical boundaries.

As such, LCDs, and in particular TN color LCDS, exhibit undesirable variations in luminance, contrast ratio and chromaticity as a function of the viewing angle between the display and an observer. Moreover, since both off-axis viewing and voltage-controlled gray scale result in variations in display luminance, contrast ratio and chromaticity, the combination of these two factors further accentuates the anisotropies evident in direct-view TN LCDs. In some instances, i.e., at particular combinations of viewing-angle and voltage-controlled gray level, the contrast ratio of the display may actually reverse and the desired color may shift to a complementary hue. Obviously, these anisotropies in display visual characteristics greatly limit the useful angular viewing cone of the display, especially for direct-view TN color LCDs employing voltage-modulated gray level control. Thus, while this LCD configuration has many desirable operating characteristics and is thus the commonplace for high-performance direct-view color LCDs (often employing an active-matrix addressing substrate to facilitate high-resolution/high-contrast operation), viewing angle limitations severely compromise the ultimate imaging performance achievable with this display device.

A number of potential solutions to ameliorate viewing angle problems in direct-view LCDs have been proposed; including the use of a diffusing optical layer at the output of the LCD, three-dimensional retardation films or optical compensators [e.g., Ong, H. L. (1993). Negative-Birefringence Film-Compensated Multi-Domain TNLCDs with Improved Symmetrical Optical Performance. SID Digest of Technical Papers, 658–661], and so-called multi-domain pixel structures [Tanuma, S. (1988). Japan Patent No. 63-106624; Otani, A. (1989). Japan Patent No. 0188520]. The use of a diffusing optical layer (e.g., ground-glass scattering screen) at the output of the LCD would result in a de-coupling of the LCD from the viewing direction; however, such a diffusing element would scatter light from both directions and would severely degrade LCD image contrast under incident ambient illumination, which is typical for most office and outdoor environments. Retardation films or optical compensators can produce some useful improvements in LCD viewing angle; however, the phase retardation imparted to the light propagating through the film is highly wavelength sensitive and can thus only compensate for a limited portion of the visible spectrum. This limits the effectiveness of retardation films or optical compensators when used for improving the viewing angle of full-color displays. Finally, relatively recent developments in multi-domain pixel structures, which are optically self-compensating alignments within the LC cell, can prove to be highly effective at improving the viewing angle of direct-view color LCDs. Unfortunately, such alignments can be difficult to establish precisely and also significantly complicate the manufacture of the LC cell. In addition, there is a tendency for the domain or alignment boundaries to appear as visible borders, patterns and striations in the display, thereby degrading the image quality of the LCD.

Typical color LCD displays use a patterned, mosaic of color selection filters created within the LC cell itself. In addition, a subtractive or stacked color LCD configuration can be created with three sequentially ordered and spectrally-selective LC cells which each subtract or remove an orthogonal component of the visible spectrum. Examples of different configurations of subtractive or stacked color LCDs can be found in U.S. Pat. No. 5,032,007 to Silverstein et. al., U.S. Pat. No. 4,917,465 to Conner et. al., and U.S. Pat. No. 4,416,514 to Plummer. While successful as a full-color LCD light valve for projection displays in which the light rays passing through the stack of subtractive cells are collimated or at least telecentric, the subtractive or stacked LCD arrangement is not desirable for use with a backlit, direct-view LCD due to viewing-angle problems arising from the parallax produced by the relatively thick stack of spectrally-selective cells. For these reasons, spatial-additive color synthesis and the planar mosaic of color selection filters are preferred approaches to fullcolor direct-view color LCDs. Examples of mosaic color filters are shown in U.S. Reissue No. 33,882 to Morozumi, U.S. Pat. No. 4,987,043 to Roosen et al. and U.S. Pat. No. 5,066,512 to Goldowsky et al.

Conventional processing or creation of the patterned mosaic of color selection filters within the LC cell is costly, inefficient and severely limited by material compatibilities with the LC fluid. These filters are placed within the LC cell, which typically has a cell gap width on the order of 3 to 7 microns, in order to reduce viewing parallax in displays with small pixel dimensions. Placing the color selection filters outside of the LC cell would require that the filters be displaced from the pixel-forming apertures within the LC cell a minimum distance equal to the thickness of the LC cell glass, which is typically on the order of approximately 1100 microns. This would result in very significant viewing parallax between a pixel aperture and the associated color selection filter, such that at off-axis viewing angles light rays from an addressed pixel could easily go through the incorrect color selection filter (e.g., light rays from an addressed RED pixel aperture actually going through a GREEN color selection filter).

As such, there exists a need for improved color filter processing and placement; allowing easier processing, the use of more efficient filter materials, and increased color image quality over a larger viewing angle range. If an optical means could be developed to control or constrain the angles at which light propagated through the layers of a direct-view LCD until the final optical interface where the light rays may be expanded to provide a wide viewing angle (thereby effectively decoupling the LCD from the viewing orientation), then absorptive color selection filters could be placed outside the LC cell or highly-efficient, interference-type color selection filters could be employed. On either case, this would enable the color filters to be located on a different optical layer than the LC cell, processed using a wider range of more efficient color filter materials and processing stages, and should result in improved manufacturing yields, reduced production costs, and significantly improved LCD color performance and luminous efficiency.

Fiber-optic faceplates (FOFPs) have been used for contrast enhancement on special-purpose Cathode Ray Tube (CRT) displays, as light-collection elements on the front surface of reflective monochromatic LCDs to enhance the reflected luminance of the display, as light channeling elements for coupling patterned color phosphor mosaics to their respective pixel apertures in rear-illuminated color LCDs, and as image relay elements for coupling the output of image generation devices to photo-recording surfaces for hard-copy applications. Several patents relate to FOFPs. These include U.S. Pat. No. 4,344,668 to Gunther et al.; U.S. Pat. No. 4,349,817 to Hoffman et al.; U.S. Pat. No. 4,558,255 to Genovese et al.; U.S. Pat. No. 4,752,806 to Haas et. al.; U.S. Pat. No. 4,799,050 to Prince et al.; U.S. Pat. Nos. 5,035,490 and 5,181,130, both to Hubby, Jr; U.S. Pat. No. 5,050,965 to Conner et al.; U.S. Pat. No. 5,053,765 to Sonehara et al.; U.S. Pat. No. 5,113,285 to Franklin et al.; and U.S. Pat. No. 5,131,065 to Briggs et al.

Haas et. al. uses a FOFP to channel light emerging from an LC layer to a lens array and then to a photoreceptor. Genovese et. al. use a FOFP to channel light emitted by a vacuum fluorescent device to expose a photosensitive member for a printing device. These applications do not relate to direct-view display devices.

Briggs et. al. use a front FOFP to channel light emerging from an emissive phosphor layer to a viewer in order to create a high luminance and high contrast thin-film electro-luminescent display. Prince et. al. employ a FOFP as a light channeling element for coupling the emissions of a patterned color phosphor mosaic excited by an ultra-violet source to their respective pixel apertures in a rear-illuminated color LCD. These patents relate to the channeling of phosphor emissions in direct-view display devices and are not directly concerned with the improvement of off-axis viewing.

Hubby, Gunther et. al., and Hoffman et. al. all relate to reflective LCD devices that use a FOFP to collect incident light from a wider acceptance angle for the purposes of enhancing the reflected luminance and contrast of the display. This approach does not address the generation of color in an LCD and, in fact, is not applicable to a color LCD because there is not sufficient reflected luminance in such a LCD device to enable color separation and filtering and still provide enough output luminance for comfortable viewing. Moreover, this approach is not concerned with enhancing off-axis viewing performance.

Conner et. al. relates to a super-twisted nematic (STN) LCD that requires a collimated light source and uses sequentially-stacked subtractive color LC cells. The primary approach is intended for projection display applications. When applied to the direct-view situation, the display output requires decollimation or diffusion. This results in degraded image contrast and color desaturation under ambient illumination. This approach does not directly address high-performance, direct-view, transmissive TN color LCDs.

None of these references appreciate the problems overcome by the present invention.

U.S. Pat. No. 5,442,467, filed on Mar. 21, 1994 (issued on Aug. 15, 1995) by Silverstein et al., the subject matter of which is incorporated herein by reference, discloses a direct-view rear-illuminated LCD device, comprising: a backlight source; a rear diffuser layer; a rear polarizer; a LC cell including a rear glass layer with addressing elements and indium tin oxide (ITO) transparent pixel electrodes, a LC layer having a top and bottom surface, and a front FOFP as a front containing element of the LC cell and being located directly in contact with the top surface of the liquid crystal layer; a mosaic array of color absorption filters either deposited on the front face of the FOFP or located on a separate but adjacent substrate; and a front polarizer or analyzer. The front FOFP provides for a relatively narrow light acceptance solid angle ($\theta_{Max}$IN) at a rear face adjacent the LC layer and a relatively wide light exit or output solid angle ($\theta_{Max}$OUT) at a front face opposite the rear face. In addition, as described below, the FOFP provides azimuthal averaging of off-axis light, the implications of which will become apparent in subsequent paragraphs.

In a second embodiment of U.S. Pat. No. 5,442,467 the front polarizer or analyzer is located within the LC cell adjacent to the rear or input face of the front FOFP. This configuration provides for analysis of the polarization state of light exiting the LC cell prior to input to the front FOFP and is designed to eliminate the impact of any significant depolarization resulting from reflections within the FOFP fibers and thereby degrading display contrast. In this case, the front polarizer or analyzer may be a thin polarization coating or a thin film composed of aligned organic dye molecules that are deposited or bonded directly on the rear or input face of the front FOFP.

Third and fourth embodiments further add a rear FOFP, located between the diffuser and the LC cell, to the configurations of the first and second embodiments. The rear FOFP is opposite of the front FOFP and includes an input face, facing and adjacent to the diffuser, that provides a high $\theta_{Max}$IN resulting in a relatively wide light input acceptance angle and an output face opposite the input face providing a low $\theta_{Max}$OUT and resulting in a relatively narrow light exit or output angle. The principal objective of the rear FOFP is to provide increased collection of light from the rear illumination source, thereby providing an improvement in the luminous efficiency of the LCD.

Fifth and sixth embodiments further add a mosaic array of spectrally-selective color interference filters or holographic filters, located between the rear FOFP and the rear polarizer, to the configurations of the third and fourth embodiments. The principal objective of the mosaic array of color interference or holographic filters is to provide a narrow spectral bandpass matched to the primary red, green, and blue spectral emission peaks of the rear illumination source. These filters are spatially registered with the red, green, and blue elements of the pixel array and transmit narrow-band light to the appropriate pixel. Illumination outside of the spectral band of each filter is reflected back through the rear FOFP to the diffuser, which then reflects the light back to the filter array via the rear FOFP. Thus, the light is effectively "recycled" until it passes through a filter with the appropriate spectral bandpass. Since spectral interference and holographic filters are angle sensitive, the rear FOFP restricts the angle of incidence from the rear illumination source and diffuser. This additional array of color selection filters minimizes absorption losses in the primary color selection filter array at the front of the display device by restricting the spectral bandpass of light propagating through the LCD optical layers and color absorption filters of the primary color selection filter array, thereby providing an improvement in both the luminous efficiency and color performance of the direct-view color LCD.

U.S. Pat. No. 5,442,467 solves the LCD viewing angle problem by utilizing the front FOFP as a front cover plate and containing element of a LC cell, in direct contact with the LC fluid material or optionally an integral thin-film polarizer, eliminating a front glass substrate. This FOFP relays the polarized light rays emerging from the plane of the optically active LC material forward to another image plane at the exit apertures of the FOFP fibers. This effectively decouples the LC layer and other LCD optical layers behind the front FOFP from the viewing orientation of the display observer, in that the observer views the light rays emerging from the image plane relayed by the FOFP. If the rays propagating through the LC layer are only accepted by the FOFP through a narrow cone of angles (i.e., a low $\theta_{Max}$IN), then the observer will only see the optical effects of the LC layer and other LCD optical elements as they would appear through a narrow viewing cone around the normal to the LCD regardless of viewing orientation relative to the coupled FOFP. If the light rays are made to diverge at the output from the FOFP or coupled additional layers of approximately index matched materials (i.e., a relatively high $\theta_{Max}$OUT), then a relatively wide range of satisfactory viewing angles can be maintained for the transmissive direct-view display. The image formed by light rays propagating in a narrow cone of angles around the normal or perpendicular to the exit plane of the LC layer can then be viewed from any reasonable angle. In addition, the azimuthal averaging properties of the FOFP result in symmetrical viewing cones, effectively averaging out the typical LCD anisotropy. Since the image is relayed directly from the output of the LC layer by the FOFP, this configuration has the added benefit that absorptive color selection filters may be located at the output of the FOFP rather than in the LC cell itself. This may be accomplished by either direct deposition on the output surface of the FOFP or by placement of the filters on a substrate adjacent to the FOFP output surface. This simplifies filter processing and cell construction and enables greater latitude in the color filter materials which can be used as well as their spectral-selection performance.

The front and rear FOFPs comprise an array of individual optical fibers which are fused together with an interstitial cladding material and then cut and polished to a desired thickness to form a plate. The creation of FOFPs with varying optical characteristics is well known in the art. The optical fibers are designed to transmit through total internal reflection light incident at controlled input or acceptance angles while rejecting or absorbing light incident at larger angles. Light entering the fibers of the rear FOFP is collected over a wide acceptance angle $\theta_{Max}$IN by use of a high numerical aperture (NA) FOFP and/or coupling to a boundary of low refractive index (e.g., air) and light exiting the optical fibers of the front FOFP is made to diverge or exit over a relatively wide angle $\theta_{Max}$OUT also by use of a high NA and/or the ultimate coupling to a low refractive index boundary. FOFPs with low NAs and/or coupling to relatively high refractive index materials (e.g., plastic, polyimide, or optical glass) restrict the light output exit angle $\theta_{Max}$OUT of the rear FOFP and the light input acceptance angle $\theta_{Max}$IN of the front FOFP, respectively.

For purposes of the present invention, it should be understood that the term fiber-optic faceplate or FOFP is interpreted in its broadest sense as any material which embodies the essential optical properties of a FOFP. Thus, the functioning of the present invention is not dependent upon the use of a fused plate of optical fibers but rather on any material layer, including a fused plate of optical fibers, which is capable of total internal reflection, controllable NA at input and output surfaces, rotational azimuthal averaging and translation of the object plane from the back surface of the layer to the front surface of the layer. It should be apparent to those skilled in the art that these essential optical properties could be imparted to a range of materials, thus producing FOFP optical equivalents. These could include micro-machined or preformed glass or plastic substrates with a plurality of optical features, a variety of polymer networks containing a duality of materials with differing refractive indices or birefringence produced by physical alignment or stress, or any other approach able to result in a substrate containing a plurality of cylindrical features whose boundaries are defined by a discontinuity of refractive indices.

The combination of low and high $\theta_{Max}$IN and $\theta_{Max}$OUT at the appropriate interfaces along with the azimuthal averaging property as described below creates remarkable property results. An observer can view the display at a relatively large range of viewing angles with only minimal variation in LCD image contrast and chromaticity as a function of viewing angle, unlike the inhomogeneities and anisotropies observed with a typical direct-view transmissive color LCD. Further, light from a rear illumination source is allowed to enter the rear FOFP at a relatively wide acceptance angle that is channelled down to a relatively narrow exit angle as it reaches the output face of the rear faceplate and travels through the display optics. Once past the output face of the rear FOFP, the light is in a relatively narrow beam as it travels through the optics. Then, when it reaches the output face of the front FOFP the beam is again expanded to a relatively wide cone or solid angle, providing a wide viewing angle. Thus, the use of the rear FOFP achieves an increase in the amount of light collected from the source and transmitted through the LCD optics, thereby providing some improvement in the luminous efficiency of the display over the single front FOFP configuration of the invention.

The important features controlling $\theta_{Max}$IN and $\theta_{Max}$OUT are the NA of the FOFP and the refractive index of optical materials or layers at the boundary with the FOFP. The NA is a value which expresses the light gathering power of an optical fiber in much the same manner as the f/# number of a lens system. The basic relationships between NA, $\theta_{Max}$, and the refractive index (N) of boundary materials or layers are described in the following equations that are well known in the art:

$$NA = N_o \sin\theta_{max} = \sqrt{N_{fib}^2 - N_{clad}^2}$$

$$\theta_{max} = \arcsin\left(\frac{1}{N_o}\sqrt{N_{fib}^2 - N_{clad}^2}\right)$$

where:
NA=numerical aperture of FOFP
$\theta_{max}$=FOFP maximum solid angle of acceptance or exit
$N_o$=refractive index of surrounding material or boundary
$N_{fib}$=refractive index of optical fiber
$N_{clad}$=refractive index of fiber cladding It is also necessary to calculate the angle of refraction for light rays that exit the FOFP, propagate through several optical layers, and finally exit the LCD at the final optical interface with air. For these rays, the angle of refraction can be calculated for each optical boundary and a final estimate obtained for the angular distribution of light at the exit of the LCD. The following equation enables the calculation of the angle of refraction at the boundary between two optical media having indices of refraction $N_1$ and $N_2$, where $N_1$ is the refractive index of the first media and $N_2$ is the refractive index of the second media:

$$\theta_{ref} = \arcsin\left[\left(\frac{N_1}{N_2}\right)\sin\theta_{inc}\right]$$

where:
$\theta_{ref}$=angle of refraction
$\theta_{inc}$=angle of incidence
$N_1$=refractive index of first optical media
$N_2$=refractive index of second optical media Thus, it can be seen that the numerical aperture of a FOFP is a function of the refractive indices of the optical fibers ($N_{fib}$) and cladding ($N_{clad}$), while the light acceptance solid angle ($\theta_{Max}$IN) and the light exit or output solid angle ($\theta_{Max}$OUT) of a FOFP are also a function of the refractive indices ($N_o$) of the material(s) at the respective boundaries of the FOFP. For the present invention, preferred values for $\theta_{Max}$ to provide a low or narrow angular distribution of light are $\theta_{Max} \leq 30°$ and preferred values for $\theta_{Max}$ to provide a high or wide angular distribution of light are $\theta_{Max} \geq 50°$.

These relations are illustrated in FIG. 1 for a typical optical fiber 10. Light enters the optical fiber 10 within the cone 12 defined by $\theta_{max}$ and is totally internally reflected to propagate down the length of the fiber 10 essentially without loss. If the relative index of the material surrounding the fiber 10 at the entrance and exit surfaces ($N_o$) is the same, then the light will exit the fiber 10 at the same angle $\theta$ at which it entered. Light which enters the fiber 10 outside of the cone 12 defined by $\theta_{max}$ is not fully guided through the length of the fiber 10 and "leaks" out of the fiber 10 into the adjacent cladding material 14.

The light rays, which are either unguided or partially guided, may pass through the cladding material 14 and enter other fibers in a fiber-optic bundle or fused faceplate but typically leak out of these fibers as well and continues to traverse the bundle or faceplate. FIGS. 2a and 2b show the effects of varying the numerical aperture of a fiber 10. FIG. 2a shows a fiber 10 having a small numerical aperture and thus a smaller light acceptance cone 12a. FIG. 2b shows a fiber 10 having a large numerical aperture and thus a larger light acceptance cone 12b. Thus, the higher the numerical aperture of the fiber 10, the larger $\theta_{max}$ at the entrance and exit.

In general, light which enters the optical fiber 10 is rotated about the central axis of the fiber as it propagates along the length of the fiber. Thus, light which enters at a given angle $\theta$ from the normal to the fiber input surface exits the fiber at the same exit angle $\theta$, but at a rotated azimuthal position $\phi$. This rotation is dependent on the number of reflections within the fiber 10 and also by the internal surfaces of the fibers. Skew rays typically undergo more rotation than meridional rays. For the application of FOFPs to LCDs, most of the illumination entering the fiber will be skew rays.

As explained above, in fused fiber optic bundles and faceplates, both guided and unguided rays undergo azimuthal rotation due to the curved fiber surfaces. As shown in FIG. 3, the consequence of this rotation is that the optical fiber 10 averages about the azimuthal position $\phi$ all of the incoming light 11 entering at a given declination angle $\theta$ such that the output consists of a hollow cone 16 with a solid angle of $2\theta$. Since the light emerging as a hollow cone 16 consists of an average about the azimuthal position $\phi$, the transmitted light intensity is equal at all azimuthal angles $\phi$. it is this property of azimuthal averaging that enables FOFPs to produce symmetrical viewing characteristics over wide angles when coupled to a LCD with inherent anisotropies in luminance and contrast.

An important consideration in interpreting the effects of any light stimulus is the effective light acceptance cone of the eye and of instruments designed to measure the effective light stimulus for vision such as photometers and spectroradiometers. The acceptance cone of the eye is quite small. That is, the solid angle $\theta$ through which light can enter the eye is narrow. In other words, the eye has a small numerical aperture. FIG. 4 illustrates the small light acceptance cone of the eye 20 and the parameters that determine this angle such as the diameter of the eye's entrance pupil and the viewing distance. The acceptance cone may be calculated as the arctan (pupil diameter/viewing distance). The pupil distance can generally be referred to as the distance between the pupil (aperture stop) 22 and the retinal image plane 24. The viewing distance is the distance between the pupil 22 and a surface plane 18. For a nominal 3 mm pupil diameter and a 508 mm viewing distance, the acceptance cone is approximately 0.34 degrees. Similar geometric considerations apply to photo-optic measurement instrumentation. Thus, for any given point of visual fixation on a surface plane 18 (e.g., a display or object), the eye 20 accepts only a small portion of the angular distribution of light emitted or reflected from that surface plane 18.

As a result of the azimuthal averaging properties of FOFPs, spatial averaging of information from the surface plane 18 also occurs to produce low-pass spatial filtering of information. Assuming the refractive indices of the FOFP and the first optical layer of the LCD (e.g., polarizer) are closely matched, the degree of such low-pass spatial filtering is a function of the viewing angle, the distance from the entrance of the FOFP to the surface plane, the light acceptance cone of the eye, and the refractive indices of the FOFP and the viewing medium (i.e., air). FIG. 5 depicts the geometrical factors associated with the spatial averaging arising from the coupling of a FOFP 24 to a LCD 32. For on-axis viewing from the eye 20, the information from the LCD 32 is averaged within the projected area defined by the acceptance cone of the eye 20, the distance from the LCD 32 to the entrance plane of the FOFP 24, and the ratio of the refractive indices of the viewing medium ($N_m$=1.0 for viewing in air) and the FOFP 24. Cone 27 shows the cone of spatial averaging for on-axis viewing angle from eye 20. The following equation describes the region of spatial averaging for on-axis viewing:

$$d = \left(\frac{PD}{V_d}\right)\left(\frac{1}{N_{FOFP}}\right)t$$

Where:
d=diameter of projected area on surface plane
PD=pupil diameter
$V_d$=viewing distance
$N_{FOFP}$=refractive index of FOFP
t=distance from entrance plane of FOFP to object plane.

For the geometry shown in FIG. 5 with t=200 microns, a pupil diameter of 3 mm, a viewing distance of 508 mm, and a FOFP refractive index of N=1.5, the spatially-averaged region is equal to 0.79 microns. This degree of low-pass filtering will not be perceptible, and thus not provide any useful attenuation of high-spatial frequency noise produced by the LCD pixel geometry. However, the low-pass filtering caused by on-axis spatial averaging within the FOFP will not produce visible image degradation.

The maximum spatial averaging will occur with a viewing angle equal to $\theta_{max}$ of the FOFP 24. This situation is also depicted in FIG. 5 from eye 21. For the case of spatial averaging for off-axis viewing from eye 21, the LCD information will be averaged within a circular annular region whose outer diameter is that of the hollow cone corresponding to the angle $\theta_{max}$ on the inner or entrance surface of the FOFP 24 and whose width is determined by the light acceptance cone of the eye 21, the angle of view relative to the normal to the FOFP surface ($\theta$), and the ratio of the refractive indices of the viewing medium ($N_{air}$=1.0) and the FOFP. Cone 28 shows the cone of spatial averaging for off-axis viewing angle from eye 21. The following relations describe spatial averaging for the off-axis viewing situation:

$$d_a = 2 \tan \theta_{max} t$$

Where:
$d_a$=outer diameter of annulus projected on the surface plane
$\theta_{max}$=half-angle of maximum acceptance cone for FOFP entrance surface t=distance from entrance plane of FOFP to the surface plane $$w_a = \left(\frac{PD}{V_d}\right)\left(\frac{1}{N_{FOFP}}\right)t \cos\theta$$

Where:
$w_a$=width of annulus projected on the surface plane
$\theta$=angle from normal to the FOFP
t=distance from entrance plane of FOFP to the surface plane
$N_{FOFP}$=refractive index of FOFP
PD=pupil diameter
$V_d$=viewing distance As an example of the off-axis spatial averaging effect, consider again the geometry shown in FIG. 5 with t=200 microns, PD=3 mm, $V_d$=508 mm, a FOFP refractive index of approximately N=1.5 with a NA=0.66, and a polarizer 30 with a refractive index of 1.5 bounding the entrance surface of the FOFP 24. For this situation, $\theta_{max}$ at the FOFP entrance surface will be 26.1° and the outer diameter of the annular spatially-averaged region is equal to approximately 196 microns. The angle $\theta_{max}$ at the FOFP exit surface is about 41.3° which corresponds with the viewing angle from the normal to the FOFP ($\theta$). The resulting width of the annular spatially-averaged region is about 0.59 microns.

The spatial averaging of pixel information within an annular region of the surface plane is not a desirable characteristic of fiber optics. However, given the minimal distances between the surface plane and the entrance plane of the FOFP when coupled to an LCD 26, the effects of annular spatial averaging in off-axis viewing should provide only minimal degradation of the display image.

SUMMARY OF THE INVENTION

One object of the present invention is to provide a fiber-optic faceplate or optical equivalent as a front retaining element of a liquid crystal cell that increases viewing angle between the display and a viewer. It is also an object to minimize or eliminate undesirable variations in luminance, contrast ratio and chromaticity.

A fiber-optic faceplate is provided including optical fibers extending between a front face and a rear face of the fiber-optic faceplate. Fiber cladding material is located between different ones of the optical fibers. The fiber cladding material may be opaquely masked on at least the front face. The fiber-optic faceplate may also have opaque cladding material.

Preferred embodiments will become apparent from a reading of the following detailed description taken in connection with the drawings.

BRIEF DESCRIPTION OF THE DRAWINGS

The invention will be described in detail with reference to the following drawings wherein like reference numerals refer to like elements and wherein.

DETAILED DESCRIPTION OF PREFERRED EMBODIMENTS

Figure 6:
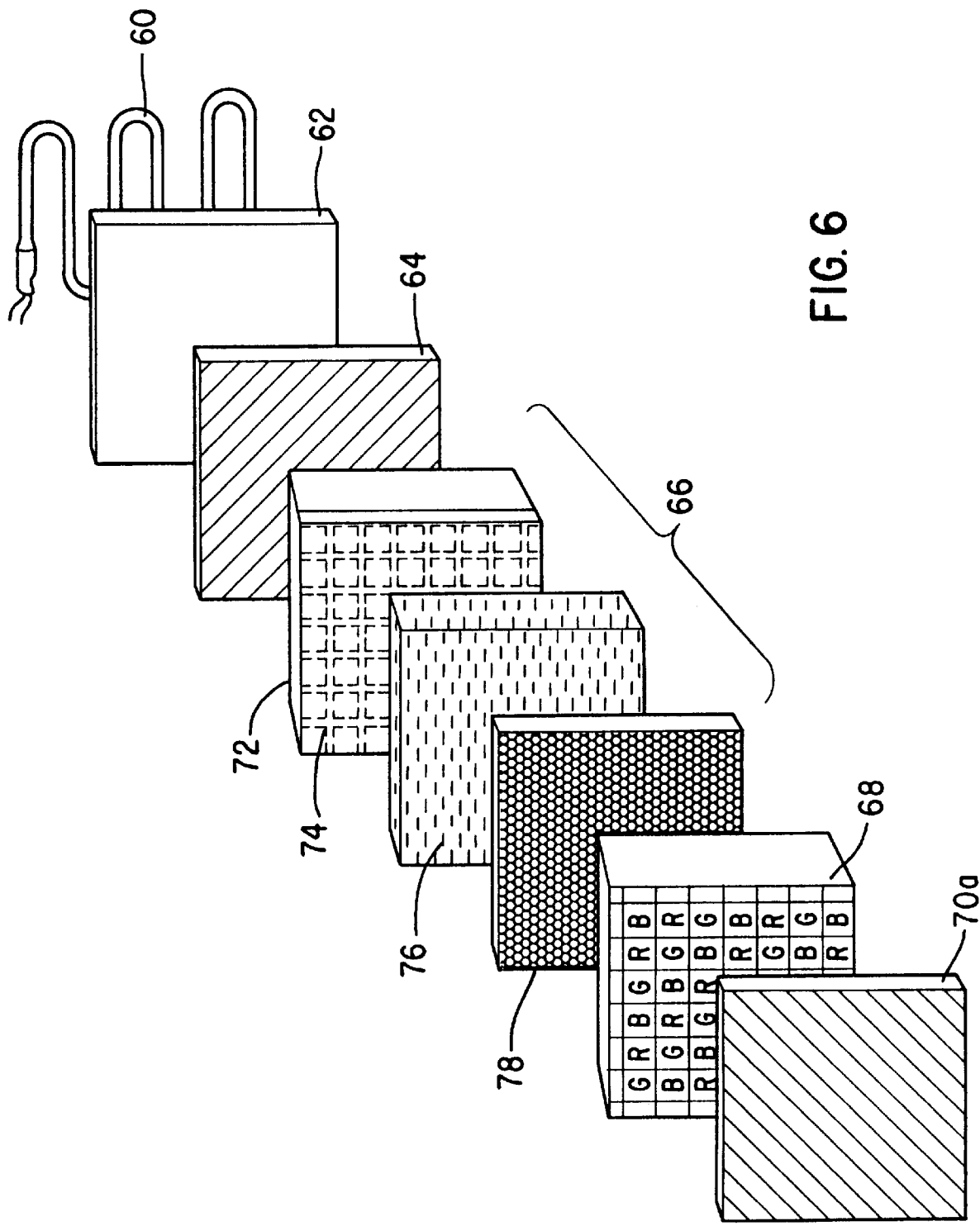
FIG. 6 shows an exploded view of a direct-view, transmissive, backlit color LCD display having a front FOFP.

FIGS. 6–11 correspond to embodiments described in U.S. Pat. No. 5,442,467, the subject matter of which is incorporated herein by reference. These embodiments will be described in greater detail to ensure a complete understanding of the present invention. FIG. 6 shows a direct-view, backlit transmissive color LCD display including a backlight source 60, preferably a tri-band hot- or cold-cathode fluorescent lamp with light collection and distribution optics, a diffuser 62, a rear linear polarizer 64, a LC cell 66, a mosaic array of color selection filters 68, and a front linear polarizer or analyzer 70a. The LC cell 66 includes a rear glass layer 72 having matrix addressing elements 74 and ITO pixel electrodes, a LC layer 76, preferably containing a TN LC material, and a front retaining element 78. Front retaining element 78, which typically has been a front glass layer, is a FOFP according to this invention.

Common electrode ITO and alignment polyimide are deposited on the rear surface of FOFP faceplate 78 and it is used in conjunction with rear cover glass layer 72 and associated matrix addressing elements 74 to contain LC layer 76. FOFP 78 is made up of a plurality of individual optical fibers, which are fused with appropriate cladding material and then cut and polished to the desired thickness. FOFP 78 in direct contact with the front of LC layer 76, relays the light rays propagating through the LC layer 76 forward to another image plane at the exit or front surface of FOFP 78.

Normally, because of the optical properties of the LC material and polarizers as well as optical path length effects through all materials comprising the LCD, off-axis viewing results in substantially varying image contrast, chromaticity and other characteristics. However, FOFP 78 transmits via total internal reflection the light passing through the liquid crystal layer for rays within a restricted solid angle determined by the numerical aperture of the FOFP 78 and the refractive indices of the materials bounding the FOFP 78. This prevents a viewer from seeing directly into the LCD from any viewing orientation because the FOFP 78 decouples the LC layer 76 and other optical elements behind it from the light rays exiting the front surface of the FOFP 78. In addition, the rotational azimuthal averaging property of the FOFP eliminates directional anisotropies and provides a uniform image at all azimuthal positions. Thus, the image relayed by the FOFP 78 as viewed by an observer over a relatively large range of off-axis angles is essentially the same as that created by a directly viewed LCD (without the FOFP) over a much narrower range of angles. The result is that enhanced contrast and color performance, as well as greater homogeneity in the appearance of the display, can be obtained over a wider range of viewing angles.

The FOFP 78 has a rear (input) face, adjacent to LC layer 76, with a specific numerical aperture. For example, with a numerical aperture of 0.80 and a LC refractive index of approximately 1.6, $\theta_{max}\text{IN}=\arcsin[(1/1.6)0.8]=30°$, thereby restricting the light transmitted by the FOFP to a relatively narrow solid angle of 30°. Light rays outside of the solid angle $\theta_{Max}\text{IN}=30°$ will leak out of the fibers or optionally be absorbed via extramural absorption (EMA) in the cladding material of the FOFP 78. Since only a relatively narrow cone of light rays propagating through the LC layer are transmitted by the FOFP 78, only rays at angles that result in a relatively high contrast and good color performance are transmitted to the output face of the FOFP 78. At the output face of the FOFP 78, a relatively high refractive index of approximately the same value of the LC material occurs at the output boundary of the FOFP 78 as well as in subsequent optical layers of the LCD. Thus, $\theta_{Max}\text{OUT}=\theta_{Max}\text{IN}=30°$. Assuming that all optical layers on the output side of the FOFP 78 are of materials with a refractive index of about 1.6 (e.g., linear polarizer and color absorption filters) and that these layers are bonded together with an index matching adhesive material, then light will propagate through these subsequent layers at approximately the same angles as those at output from the FOFP with a $\theta_{Max}\text{OUT}=30°$. At the final optical interface of the LCD with air, the solid angle of light rays exiting the LCD will expand according to the angle of refraction produced at the final optical interface of the LCD, $\theta_{ref}=\arcsin[(1.6/1.0)\sin 30°]=53.13°$. Thus, $\theta_{Max}\text{OUT}$ for the entire LCD, or the effective viewing angle of the direct-view LCD according to this embodiment, is equal to 53.13°. A restricted solid angle of light rays propagating through the LC layer and other previous optical layers and yielding the good contrast and color performance of this restricted solid angle is expanded at the final optical interface of the LCD combined with the azimuthal averaging property of the FOFP, good contrast and color performance are produced over a much larger solid angle at output.

In order for the image to appear maximally sharp and focused and to prevent optical crosstalk between adjacent pixels (that would also result in degradation of color performance when a spatial mosaic of color filters is utilized for color selection in a color LCD), the input face of the FOFP 78 should be in close proximity to the pixel-forming plane of the display. That is, the distance between the input face of the FOFP 78 and the pixel-forming plane of the LCD should be small compared with the size of a display pixel. Since the pixel-forming plane of the LCD is the LC layer 76 and typical pixel sizes are in the range of 100 to 400 microns, the input face of FOFP 78 is in very close proximity to the LC layer 76, separated only by the ITO and LC alignment layers, which are each typically only several hundred Angstroms in thickness. FOFP 78 therefore maintains the polarization state of light propagating through the LC cell 66 as initially polarized by input polarizer 64 and optically rotated by the TN or STN configuration of LC layer 76 such that it can be appropriately analyzed by output polarizer or analyzer 70a to produce the light modulating function of LC cell 66. Thus, FOFP 78 must be constructed from optical fibers that do not disturb substantially the polarization state of light propagating through the FOFP. If such polarization is substantially disturbed by internal reflections within the FOFP, then the contrast of the LCD will be degraded.

Fiber-optic faceplates of various sizes and numerical apertures, including those constructed with polarization-maintaining optical fibers, can be obtained through Incom Inc.—Fiber Optic Div., of Southbridge, Mass.; Galileo Electro-Optics Corp., of Sturbridge, Mass.; and Schott Fiber Optics, Inc., of Southbridge, Mass. In addition, specialty optical fibers with various optical characteristics and polarization preserving properties are available from 3M Specialty Optical Fibers of West Haven, Conn.

According to one embodiment, the display is a high quality, direct-view color LCD and includes a mosaic color filter array 68 consisting of a plurality of red, green and blue filter elements, each corresponding to a pixel of the display. The number of filter elements in the array depends on the resolution and the size of the display.

Preferably, mosaic color filter array 68 is composed of a mosaic of color absorption filters which enable relatively homogeneous color selection over a broad range of viewing angles. A spectral absorption filter works by taking the input from a relatively broad-band source of illumination and absorbing, via suspended dyes or pigments, selected portions of the broad-band spectrum. Thus, the absorption filter transmits those portions of the input spectrum that are not absorbed by the dyes or pigments. If, for example, the filter was a red filter, it would transmit light within the long-wavelength or red region of the visible spectrum while absorbing other portions of the spectrum such as the green and blue regions. Standard color absorption filters constructed using glass or plastic binding materials are well known in the art and are available from a wide range of manufacturers.

As previously described, there are problems associated with locating filter 68 within the LC cell itself. Standard glass or plastic filters cannot be used to create the filter mosaic and specialized thin-film color absorption filter materials must be used and deposited directly in stages (for each color) on the internal surface of the LC cell substrate or containing element, for example the internal surface of either the front or rear cell glass of a typical color LCD. Such processing or coating is typically accomplished using spin coating, which severely limits the materials that can be chosen for the filter. Additionally, the filter has to be processed when forming the cell and the filter materials must be compatible with the LC material or an additional passivation layer formed by another processing step. Color absorption filter materials for use in constructing thin-film color filter mosaics are available from a number of sources, including Brewer Sciences, Inc. of Rollo, Mo., as well as Nitto Denko and Toppan both of Japan.

Additionally, there are problems with placing a color filter mosaic outside of the cell in a typical color LCD, such as a direct-view color TN LCD. The gap between the color filter and the LC layer results in parallax when viewed off-axis, resulting in incorrect registration between display pixels and their respective color filters. As such, a typical, high-resolution color LCD demands placement of the color filter mosaic within the LC cell.

However, because this embodiment utilizes a FOFP as a front retaining element for the LC cell, the pixel-forming plane of the LC layer is relayed or guided to the output face of the FOFP 78. Accordingly, color filter mosaic 68 composed of thin-film color absorption materials can be deposited directly to the front or output face of FOFP 78 or, alternatively, a separate substrate containing a mosaic of color absorption filters can be bonded directly to the front (output) face of FOFP 78, between FOFP 78 and front polarizer or analyzer 70a, with little or no misregistration due to angular parallax between LCD pixels and their respective color filters.

The ability to locate the mosaic of color filters outside of the LC cell allows a much greater variety of filter materials to be selected, such as glasses, plastics, gelatins or other filter materials. This can result in improved LCD color performance since more spectrally selective filters materials can be utilized and can also reduce processing costs because the filter can be processed separately from the LC cell.

Front polarizer or analyzer 70a is a linear sheet polarizer of the same construction and characteristics as rear polarizer 64. Suitable sheet polarizers of various thicknesses and extinction ratios can be obtained from a range of suppliers including Nitto and Sanritzu, both of Japan and Polaroid Corp., of Cambridge, Mass.

Figure 7:
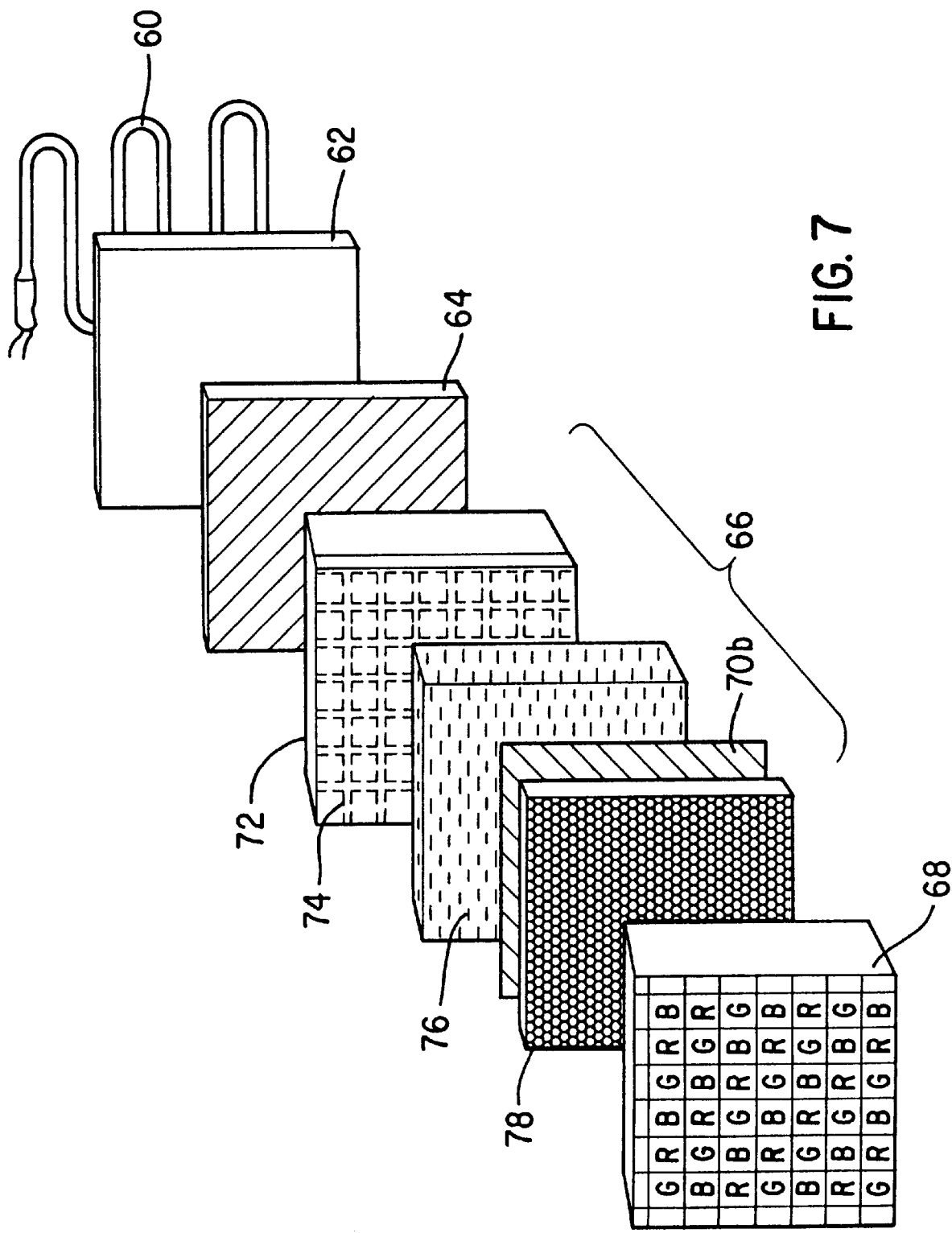
FIG. 7 shows an exploded view of the display of FIG. 6 but incorporating a polarizer integral to the LC cell and adjacent to the input surface of the front FOFP.

A second embodiment is illustrated in FIG. 7, where front polarizer or analyzer 70a is replaced by front polarizer or analyzer 70b located within the LC cell 66 adjacent to the input face of the FOFP 78. This alternative configuration enables analysis of the polarization state of light exiting the LC layer 76 prior to entering the FOFP 78, thereby avoiding any potential degradations in LCD contrast resulting from depolarization in the optical fibers of the front FOFP. However, since the pixel-forming plane is within the LC layer 76, the thickness of the internal front polarizer or analyzer 70b should be relatively small compared to the size of the LCD pixels. Since LCD pixel sizes will in general range from approximately 100 to 400 microns, typical high-efficiency sheet polarizers that range in thickness from about 150 to 250 microns for front integral polarizer 70b will result in some loss of image sharpness and optical crosstalk between adjacent pixels. According to the teachings of U.S. Pat. No. 5,181,130 to Hubby and U.S. Pat. Nos. 2,400,877; 2,481,380; and 2,544,659 to Dreyer, internal front polarizer 70b can be formed by a thin layer of aligned organic dyes to maximize the ratio of pixel size to polarization layer thickness. Polarization layers formed by such processes can be within the range of 0.5 to 50 microns. In addition, thin polarizer coatings can be obtained from Sterling Optics of Williamstown, Ky.

Figure 8:
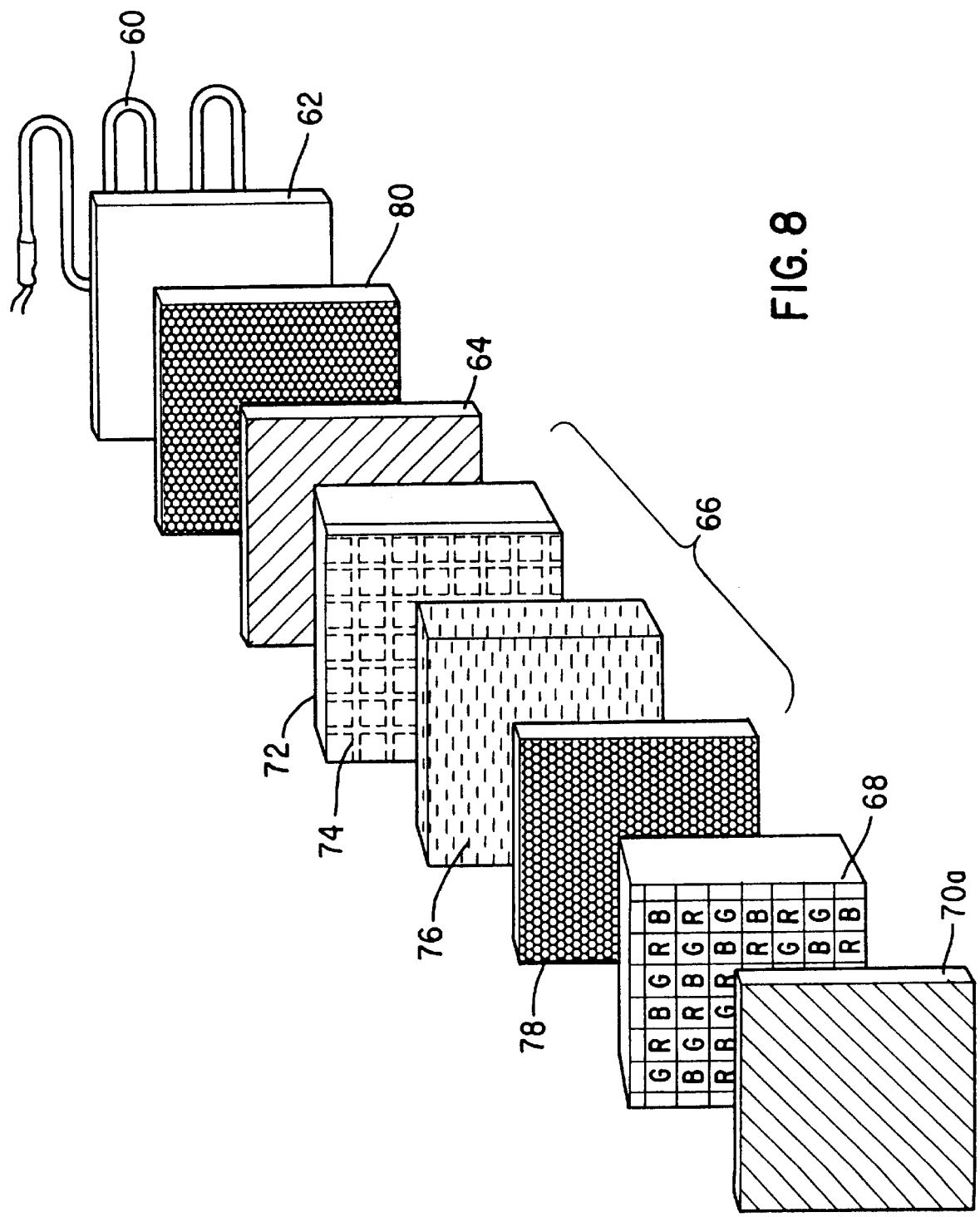
FIG. 8 shows an exploded view of the display of FIG. 6 but further including a rear FOFP for improving the collection of light from the backlight and diffuser.
Figure 9:
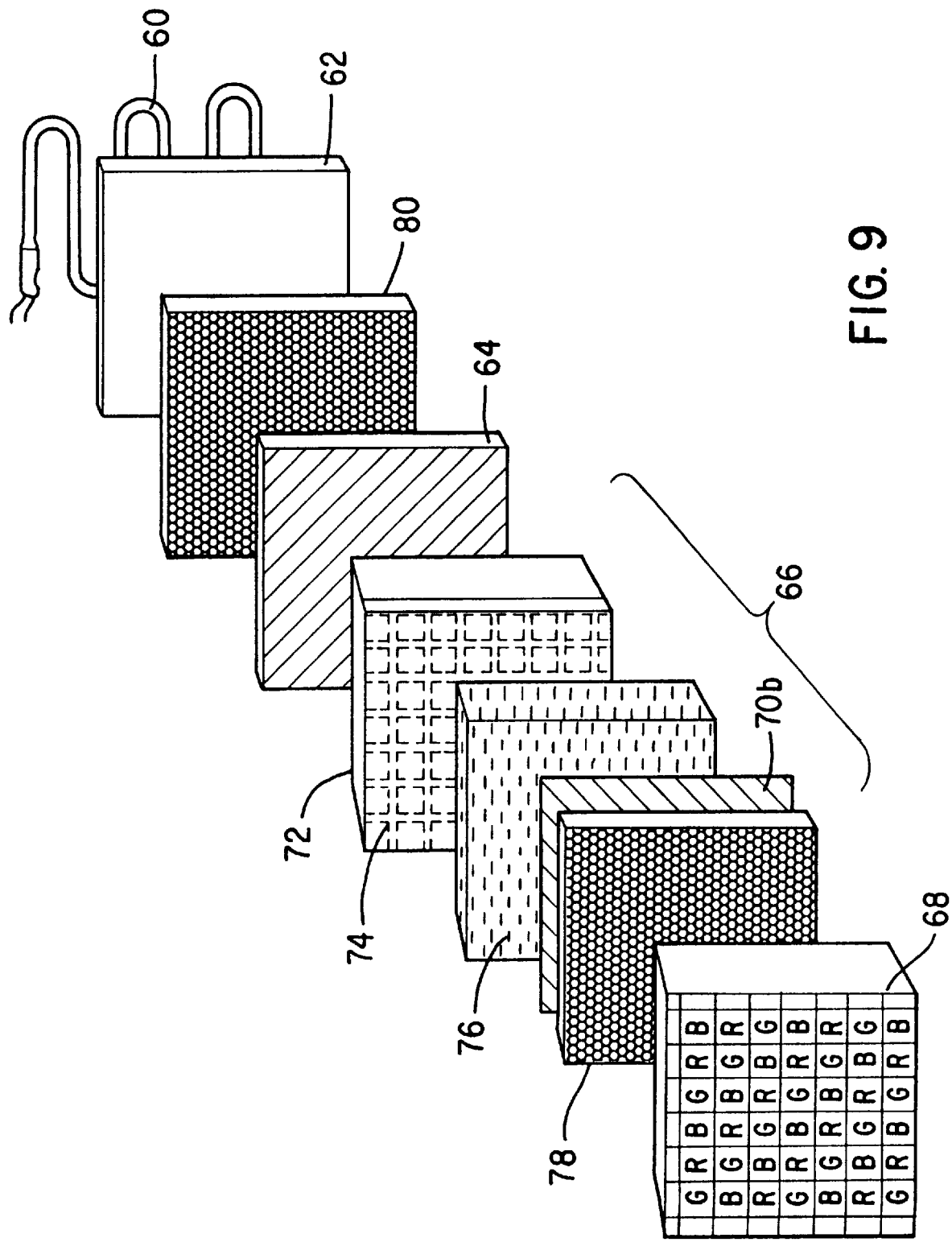
FIG. 9 shows an exploded view of the display of FIG. 7 but further including a rear FOFP for improving the collection of light from the backlight and diffuser.
Figure 10:
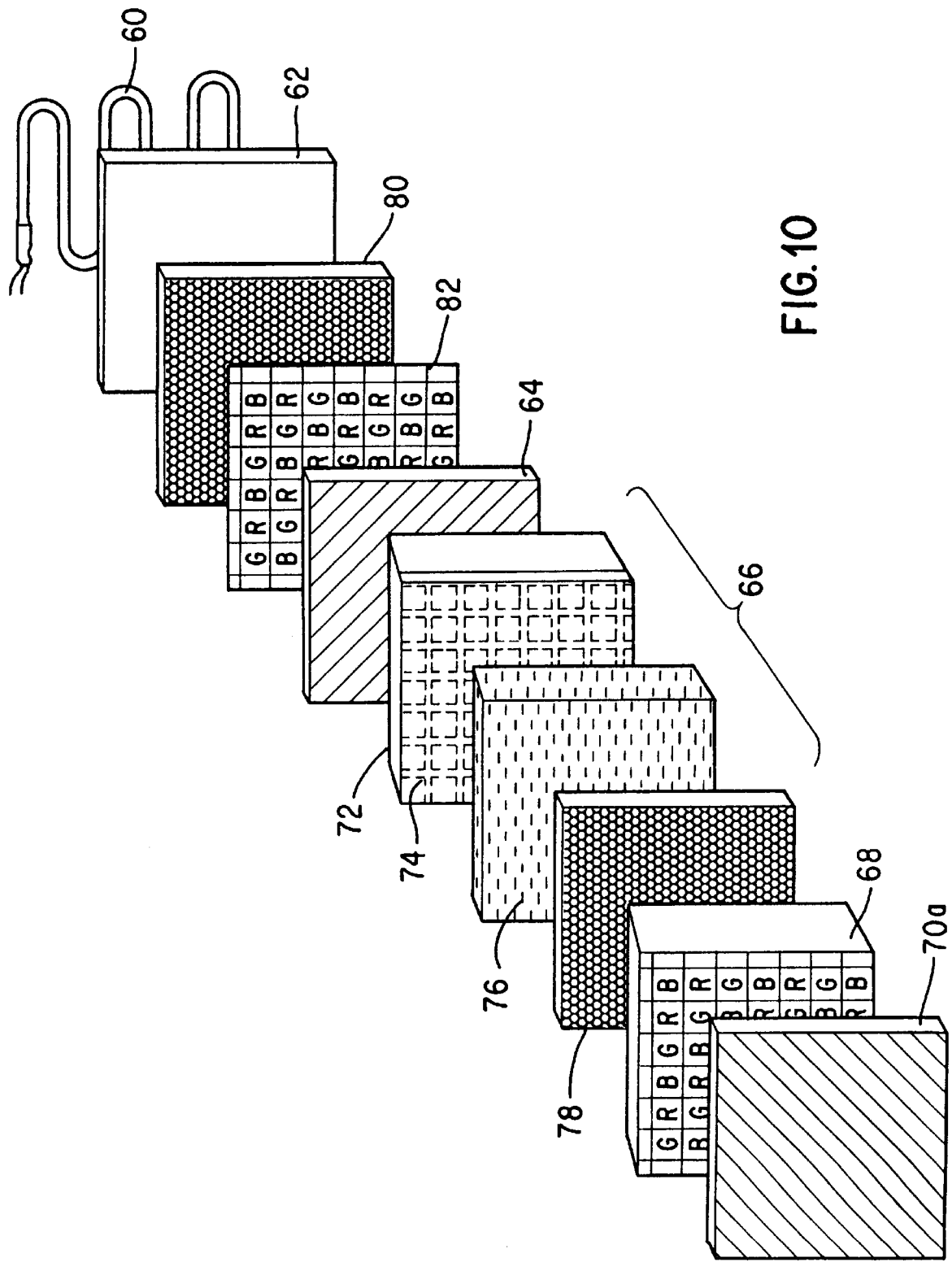
FIG. 10 shows an exploded view of the display of FIG. 8 but further including a mosaic array of color interference or holographic filters between the rear polarizer and the rear FOFP for improving luminous efficiency and display color performance.
Figure 11:
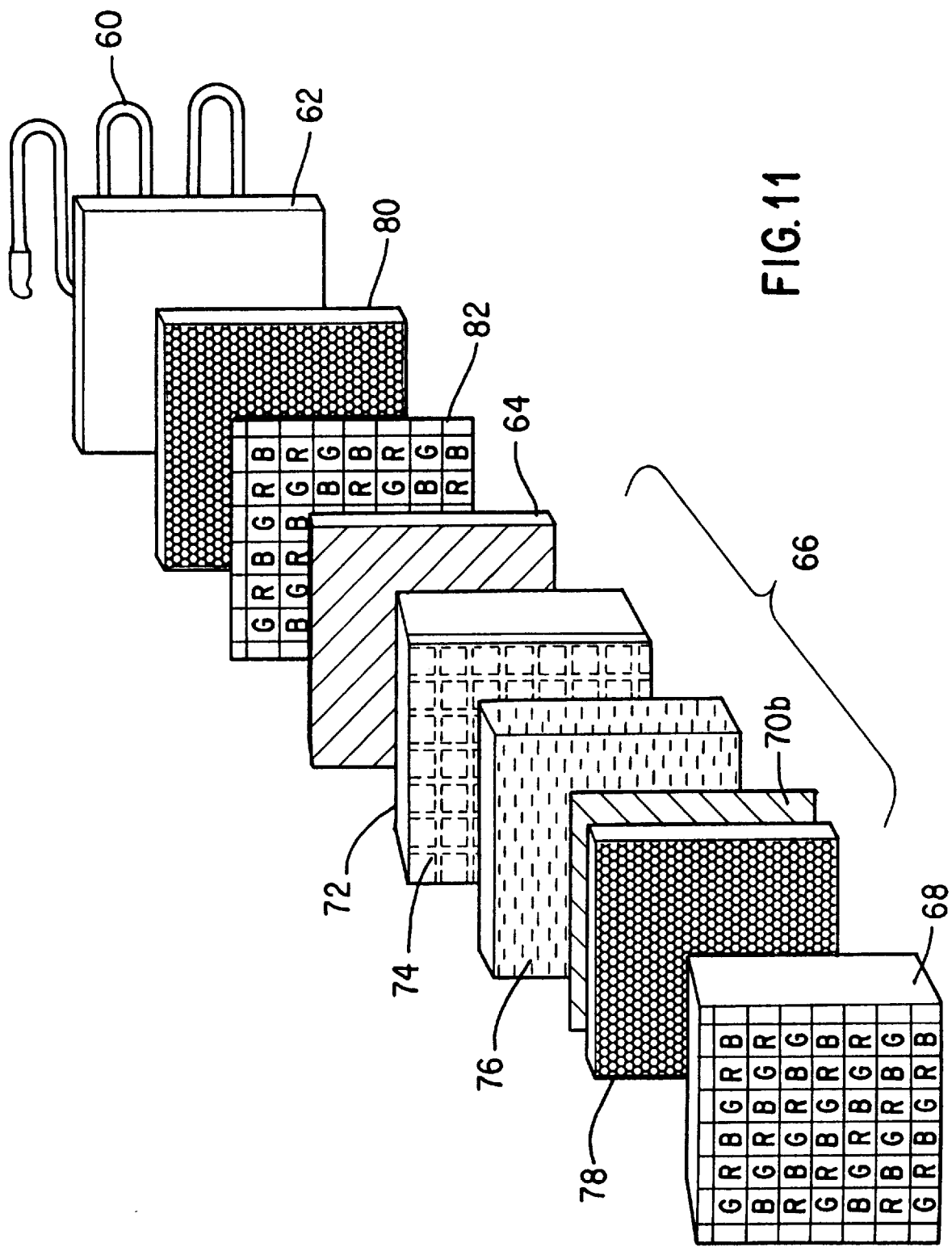
FIG. 11 shows an exploded view of the display of FIG. 9 but further including a mosaic array of color interference or holographic filters between the rear polarizer and the rear FOFP for improving luminous efficiency and display color performance.

An even further improved direct-view LCD display can be achieved according to a third and fourth embodiment by addition of a rear FOFP 80 between rear polarizer 64 and diffuser 62, as illustrated in FIGS. 8 and 9. By incorporating a rear FOFP 80 with an input surface facing diffuser 62 and bounded by air, and an output face bonded to rear linear sheet polarizer 64 that possesses a relatively high refractive index of approximately 1.6, a noticeable increase in the luminous efficiency of the LCD can be achieved via improved angular collection of light emitted from rear-illumination source 60 and diffused by optical diffuser 62.

In at least the first two embodiments, off-axis light with an angle of incidence>$\theta_{Max}$IN for the front FOFP 78 is not totally internally reflected by the optical fibers and is either unguided or optionally lost by absorption via EMA in the cladding material of the FOFP. In the calculated example, $\theta_{Max}$IN=approximately 30°. Thus, only light within a solid angle of 30° is transmitted by FOFP 78 while light rays outside of this solid angle are wasted for the purposes of generating a luminous image at the output of the LCD. By locating the additional rear FOFP 80 between the diffuser 62 and rear polarizer 64 with the bounding refractive indices as described above and by using a FOFP with a numerical aperture of 0.80 for example, $\theta_{max}$IN=arcsin [(1/1.0)0.8]= 53.13° at the input to rear FOFP 80 and $\theta_{max}$OUT=arcsin [(1/1.6)0.8]=30° at the output of rear FOFP 80. Light is accepted or collected over a much wider solid angle by inclusion of FOFP 80 and then exits with little or no loss at a solid angle that approximately matches that of front FOFP 78. This effectively "concentrates" the available light emitted from rear-illumination source 60 and diffused by optical diffuser 62 to improve the luminous efficiency of the LCD and provide a brighter display image. The third and fourth embodiments, illustrated in FIGS. 8 and 9, respectively, reflect the incorporation of rear FOFP 80 into the first and second embodiments.

While the third and fourth embodiments further improve the luminous efficiency of the LCD over the first and second embodiments, the absorption filters of the color filter mosaic 68 still contribute significant losses in luminous efficiency since this type of filter achieves color selection by absorbing unwanted wavelengths. Given that a relatively broad-band spectral input composed of the full input spectrum of the display is passed through each of the primary color filters (e.g., red, green, and blue) composing filter mosaic 68, each filter will absorb or waste approximately two-thirds of the available light it receives (e.g., a red absorption filter will pass long-wavelength or red light but absorb middle-wavelength or green light and short-wavelength or blue light). Despite these inefficiencies, absorption filters are used for color selection in virtually all direct-view color LCDs since they can provide good color performance over a broad range of viewing angles. Much more efficient color selection filters can be found in multi-layer dielectric interference filters or holographic types of filters, that also have the useful property of reflecting wavelengths outside of their pass band rather than absorbing them. However, since such filters operate by changing phase relations between transmitted and reflected light waves resulting in constructive and destructive interference, they are extremely sensitive to optical path length effects and thus the angle of incidence of incoming light. The restricted angles over which such filters operate effectively limit their utility for color selection in typical direct-view color LCDs.

The use of a rear FOFP 80 in embodiments three and four restricts the solid angle of light at the exit surface of the FOFP and therefore allows for a unique use of interference or holographic types of filters to improve the luminous efficiency and color performance of a color LCD. Embodiments five and six, illustrated in FIGS. 10 and 11, respectively, incorporate a mosaic array of color interference or holographic types of filters 82 between rear FOFP 80 and rear linear polarizer 64 of embodiments three and four. In principle, and depending on the optical configuration of LCD materials, filter mosaic 82 can be located at different positions between rear FOFP 80 and front filter 68. Mosaic 82 contains red, green and blue filter elements, directly corresponding to array 68 in resolution and location of individual elements such that a red element of filter mosaic 82 corresponds to a red element of filter 68 at any given pixel location. Suitable interference filter materials of high spectral selectivity can be obtained from Optical Coating Laboratories, Inc., of Santa Rosa, Calif. Highly selective filter materials produced by holographic processes are also available and can be obtained from the Optical Element Venture of DuPont Imaging Systems, of Wilmington, Del.

The mosaic of interference or holographic filters 82 functions to improve LCD luminous efficiency and color performance in the following manner. If, for example, light of long visible wavelength (red) encounters an element of mosaic 82 that is tuned to transmit long wavelength light (red filter), this wavelength is transmitted through the filter. However, rather than absorbing the medium (green) and short (blue) visible wavelengths, the red interference or holographic filter element reflects these wavelengths back through rear faceplate 80. These reflected wavelengths again encounter diffuser 62, which scatters and reflects these wavelengths back through rear FOFP 80 to filter mosaic 82 where they again have a probability of encountering a filter element of mosaic 82 that will transmit long-wavelength or red light. This process continues until the light eventually encounters a filter with the correct pass band for long-wavelength light, and the same process occurs for the medium (green) and short (blue) wavelengths. Further, because the filter elements of mosaic array 82 correspond directly to filter elements of absorption filter mosaic 68, they perform a "pre-selection of wavelength or color" such that the corresponding absorption filter elements of mosaic 68 perform only a "final selection or tuning of wavelength or color" and there is relatively little absorption occurring in the elements of filter mosaic 68. Thus, these final embodiments make better use of the available light and result in even higher luminous efficiency and improved color performance of the LCD while still maintaining a wide viewing angle.

Diffraction is the deviation from rectilinear propagation that occurs when light waves advance beyond any obstruction or boundary. The obstruction may be opaque, as in the case of a knife-edge or pinhole, or may be a boundary defined by two transparent materials with different refractive indices. Since light diffracts or deviates from a straight path when encountering a boundary or obstruction, the intensity distribution of a point of light which undergoes diffraction, when projected on a surface some distance from the boundary, will be characterized by a spread function or diffraction pattern. For light transmitted through an aperture, the degree of diffraction or angular deviation in the path of light is determined by the size and shape of the aperture and the wavelength(s) of light from the source. The diffraction pattern at some remote position from the aperture is additionally a function of the distance from the aperture to the plane of observation. The remote or far-field diffraction pattern is typically referred to as a Fraunhoffer diffraction pattern. In optical systems where the circular apertures of lenses, stops and pupils are typically constraints, the Fraunhoffer diffraction pattern is often referred to as the Airy disk. The Airy disk arising from light passing through a circular aperture is well described by a first-order Bessel function with a central bright region surrounded by a series of faint rings of rapidly diminishing intensity. Approximately 84% of the light intensity from a diffracted point source is contained within the first dark ring of the Airy disk. As such, the Airy disk characterizes the blur circle produced by diffraction-limited optical systems.

Figure 12:
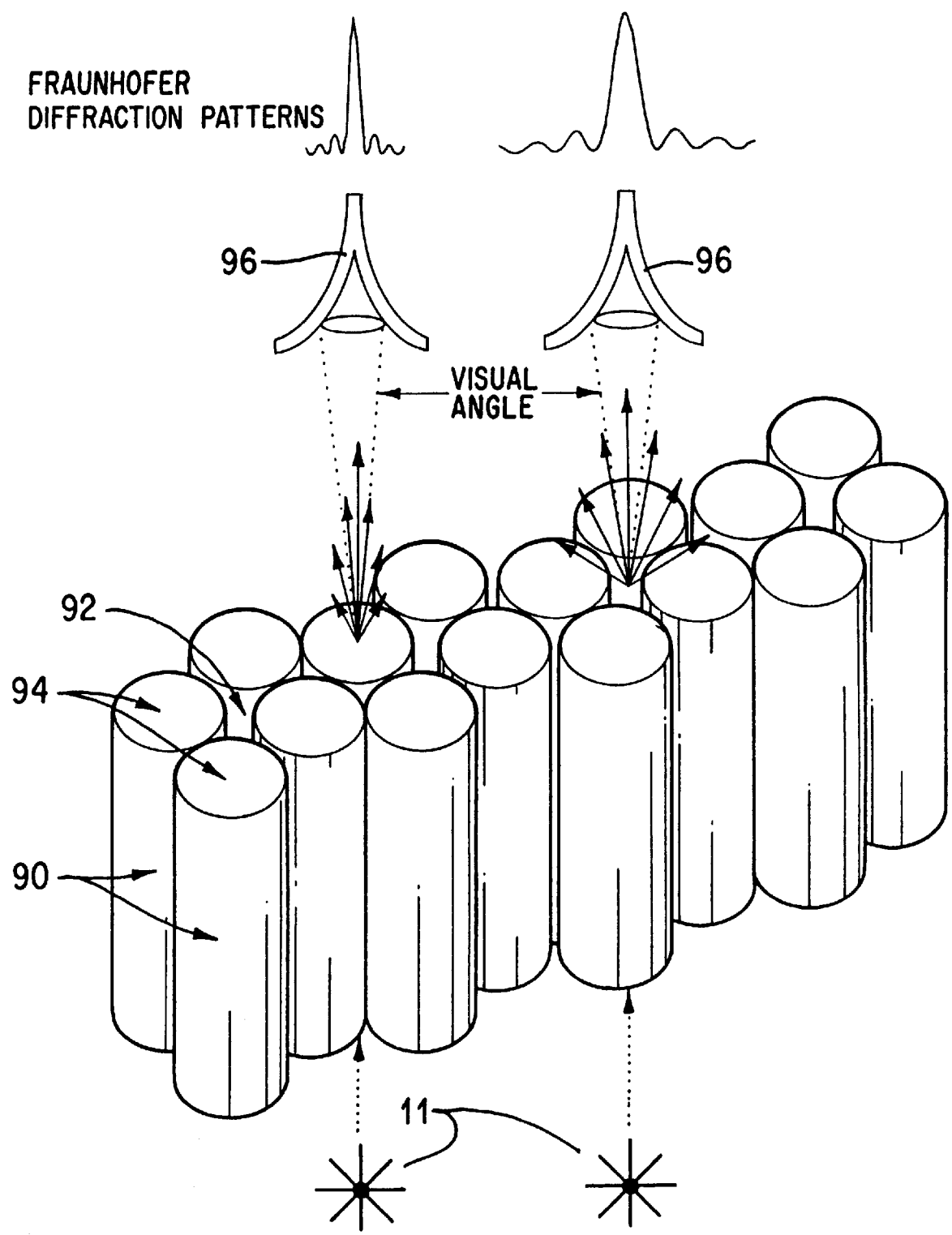
FIG. 12 illustrates light diffraction in a fiber-optic faceplate for on-axis light incidence.

In assessing the impact of diffraction on FOFPs, the present invention focuses on the angular dispersion of light incident on the FOFP. As shown in FIG. 12, the FOFP consists of a fused plate of optical fibers and interstitial cladding, which constitute two distinct populations of very small apertures. Both the input and output surface of the optical fibers 90 can be considered as small circular apertures 94. The cladding apertures 92 on the two plate surfaces are somewhat irregular in shape and size. However, for purposes of discussion, the cladding apertures 92 will be described as circular apertures with a diameter estimated from the mean diameter of all cladding apertures 92. On-axis illumination 11 entering the FOFP is diffracted into an angular distribution of light paths. The degree of diffraction and hence the width of the angular distribution of light paths is inversely proportional to the diameter of the aperture. Thus, the smaller the aperture the larger the angles into which light propagation through the FOFP is diffracted. The cladding apertures 92, being significantly smaller than the fiber apertures 94, diffract the incoming light into the largest angles. FIG. 12 also shows the relative Fraunhoffer diffraction patterns or Airy disks which would result from the projection of the fiber and cladding diffraction angle distributions on the retina of an observer 96 located some fixed distance from the FOFP. The angular spread resulting from diffraction can be estimated from the following equation:

$$\theta_{diffr} = 1.22 \left( \frac{\lambda\, 180}{D\, \pi} \right)$$

Figure 1:
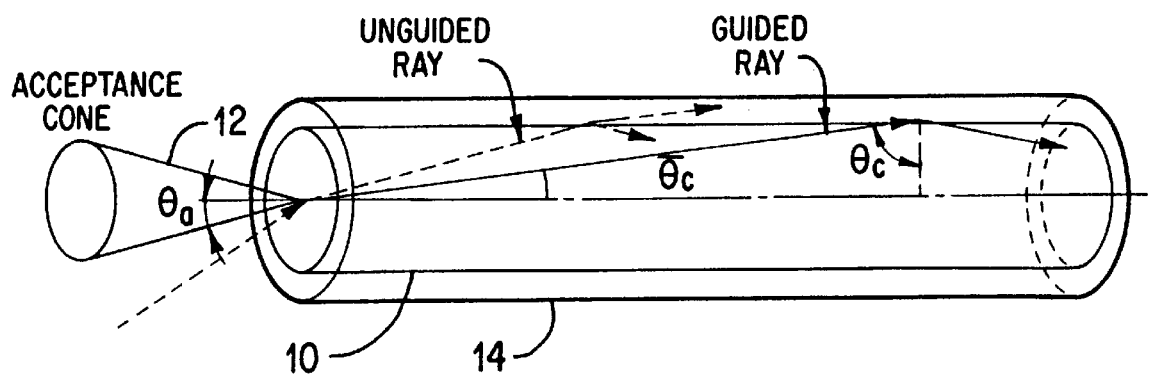
FIG. 1 illustrates principles of light propagation through an optical fiber.
Figure 2A:
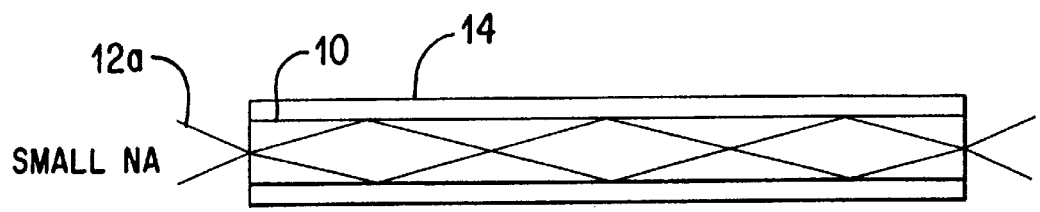
FIGS. 2a and 2b illustrate the effects of varying the numerical aperture of an optical fiber.
Figure 2B:
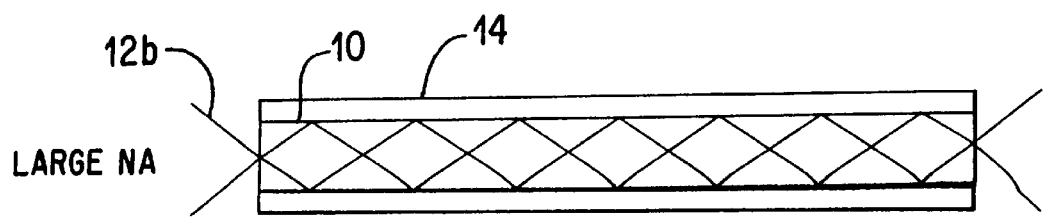
Figure 3:
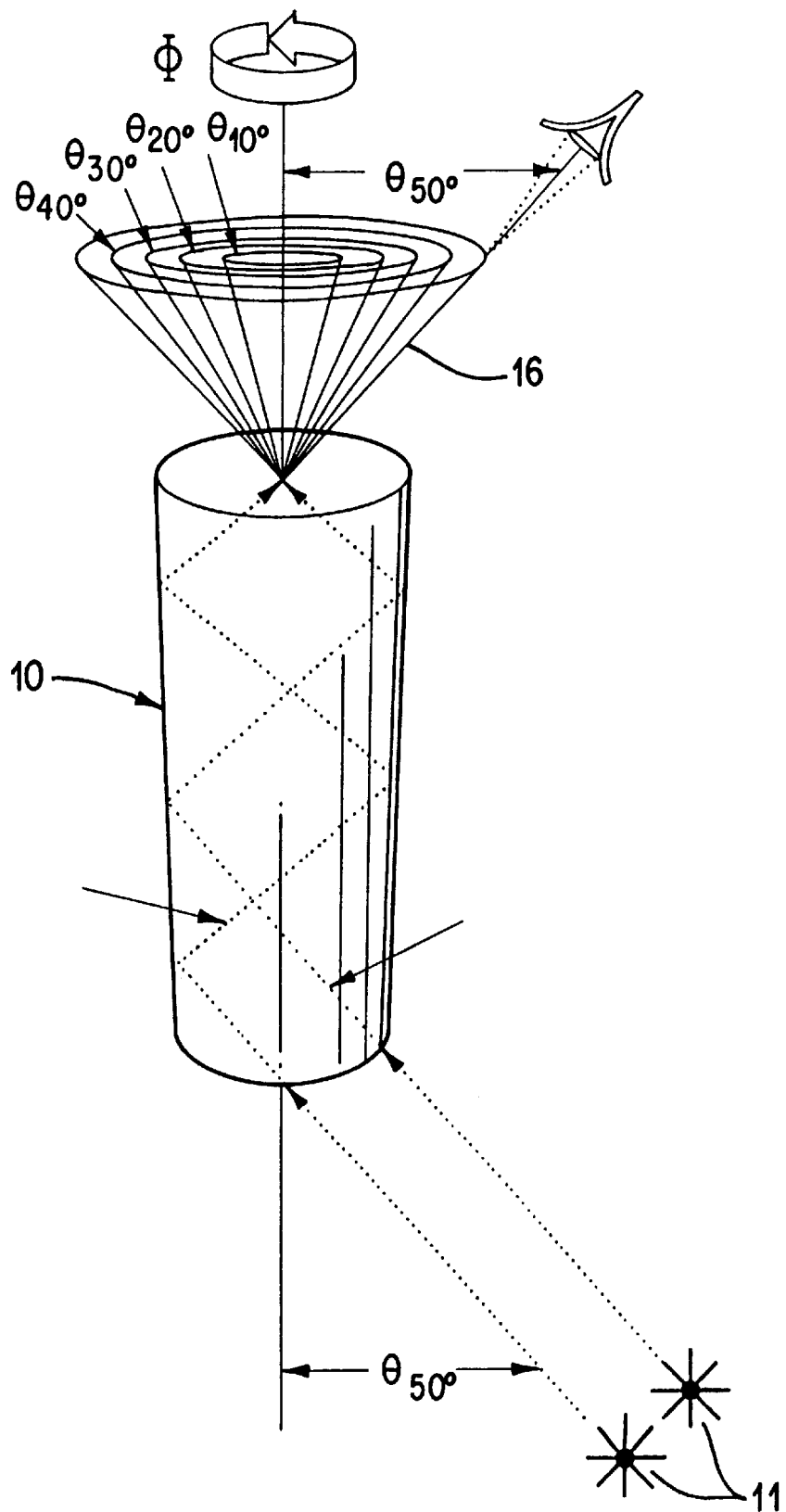
FIG. 3 illustrates light propagation through an optical fiber to produce hollow output cones of light consisting of the average of all azimuthal angles.
Figure 4:
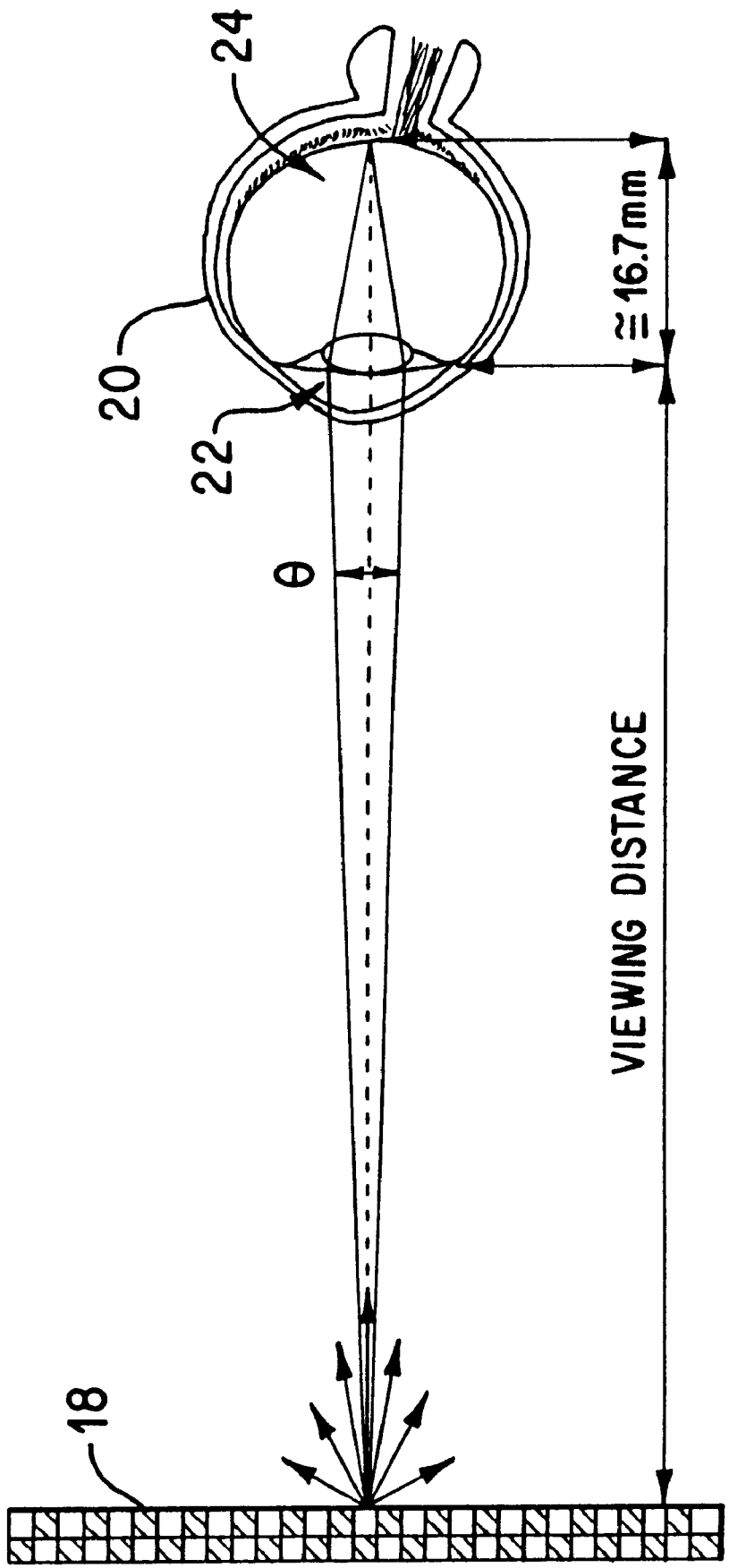
FIG. 4 illustrates the small light acceptance cone or numerical aperture of the eye.
Figure 5:
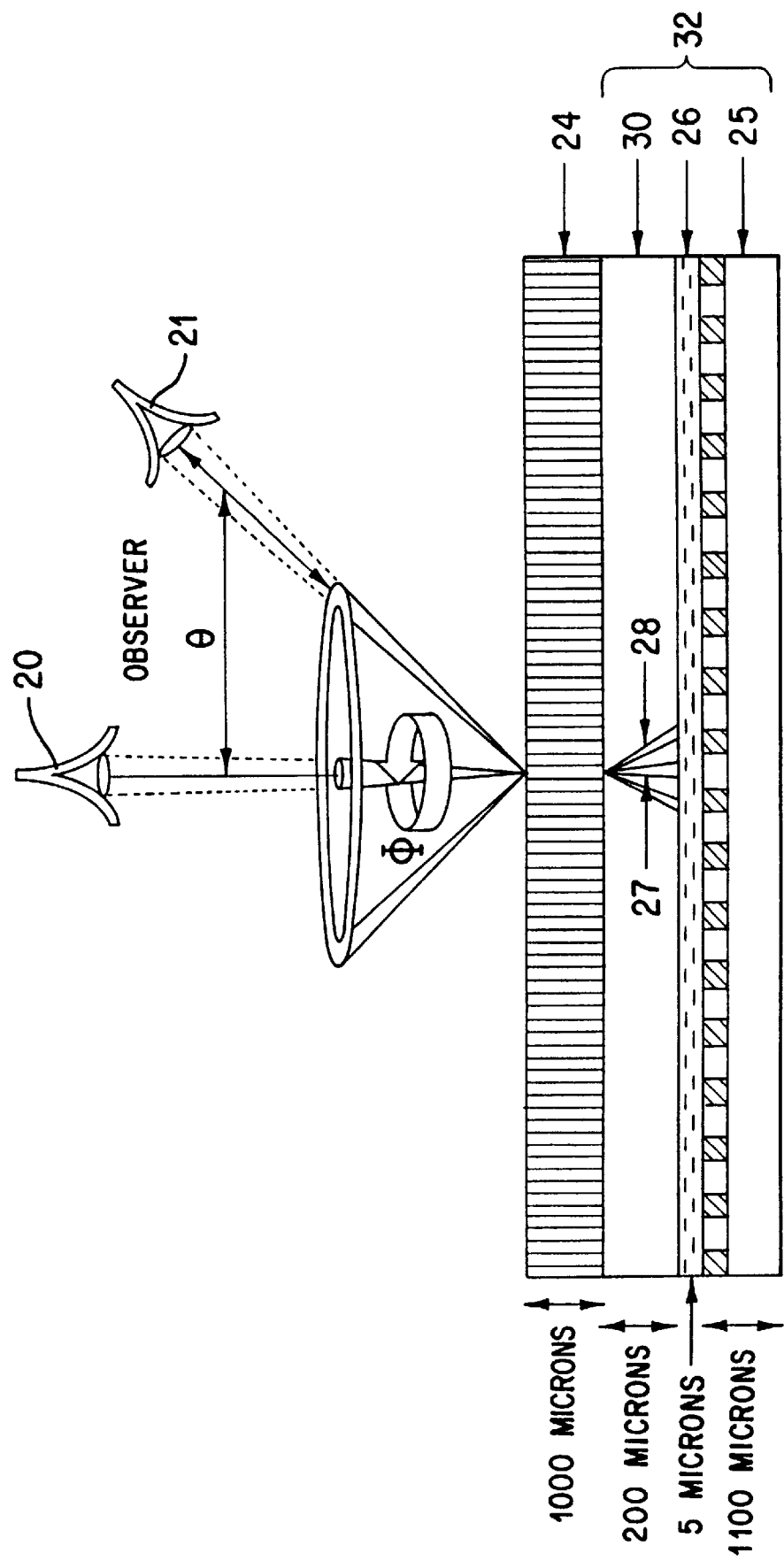
FIG. 5 illustrates how viewing through a fiber-optic faceplate results in spatial averaging of information generated at the object plane.

Where:
$\theta_{diffr}$=half-angle corresponding to first dark ring of the Airy pattern (degrees)
D=diameter of circular aperture
γ=wavelength of light By reference to the above equation and assuming nominal fiber and cladding diameters of 7 microns and 0.5 microns, respectively, it can be estimated that for incoming light of 550 nm, the diffraction angle corresponding to the first dark ring of the Airy disk is approximately 5.49° for the fiber apertures 94 and 76.9° for the cladding apertures 92. For on-axis illumination and on-axis viewing of a LCD with coupled FOFP, the effects of diffraction in the FOFP will be primarily manifested as a small reduction in display luminance. This is in large part a result of the small light acceptance cone of the eye (and of most photometric measurement instruments) as described above with respect to FIG. 4.

FOFP diffraction is responsible for anomalous reductions in on-axis contrast for coupled LCDs. Establishing this causal relationship would enable the development of effective means to reduce these observed reductions in on-axis LCD contrast. To describe this problem, consider the angle-dependent contrast performance of typical twisted-nematic (TN) or super-twisted nematic (STN) LCDs that has been previously described. The contrast ratio of such displays is typically very high when observed on-axis but exhibits a progressive degradation at off-axis viewing and light propagation angles. This observed contrast degradation, while progressive, is not isotropic for the reasons previously described. At some extreme angles, the contrast of the display may actually reverse resulting in a negative image. These off-axis contrast degradations do not affect the high on-axis contrast performance of the display due to the small light acceptance cone of the eye or of most photometric measurement instruments. However, when a FOFP is coupled to such an LCD, the on-axis contrast performance of the FOFP-coupled display is substantially reduced below the levels achieved without the FOFP. Improvement in the on-axis contrast performance of FOFP-coupled LCDs provide an important enhancement.

Figure 13:
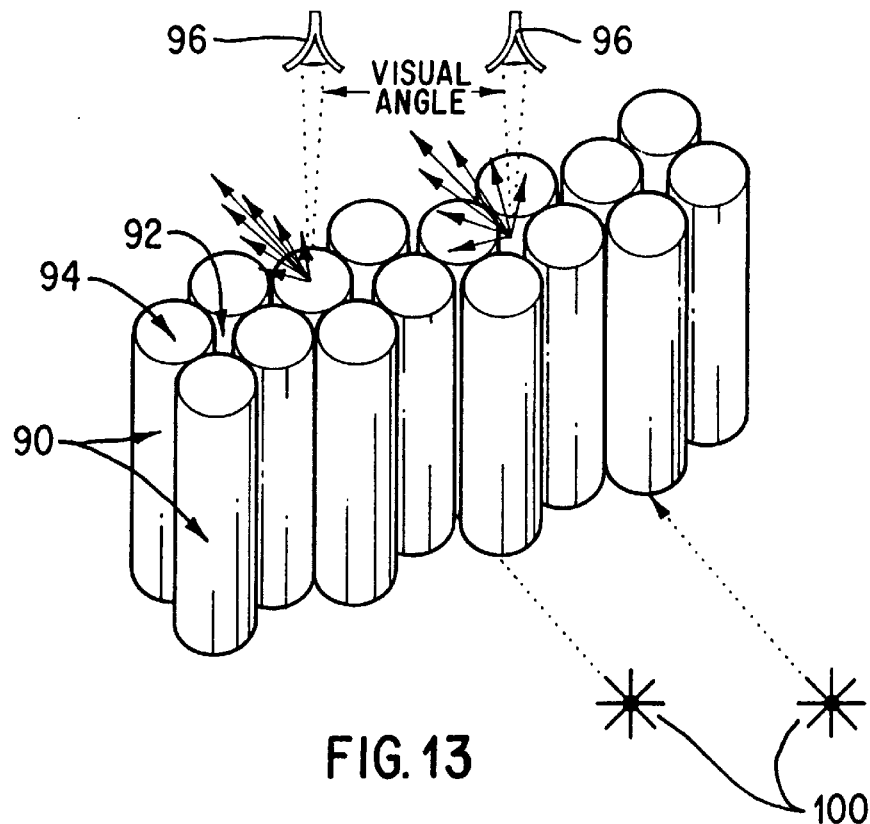
FIG. 13 illustrates light diffraction in a fiber-optic faceplate for off-axis light incidence.

For light propagating at off-axis angles to contaminate the on-axis contrast performance of an LCD with FOFP, the angular direction must be changed such that some of this light gets coupled into the small light acceptance cone of the eye or measurement instrument. FIG. 13 shows the incident illumination 100 emerging from the source (i.e., the backlight) at an angle which is off-axis from the normal to the FOFP input surface. At the output surface, the light is diffracted by the fiber apertures 94 and the cladding apertures 92 with an angular distribution about the direction of light propagation. For the larger fiber apertures 94, the relatively small diffraction angles do not diffract much light into the light acceptance cone of the eye 96 or instrument. However, for the much smaller cladding apertures 92, the angular distribution of diffracted off-axis light is quite large and a significant amount of the off-axis light is diffracted into the small light acceptance cone of the eye 96 or measurement instrument. In this manner, the off-axis light from the LCD (and corresponding contrast degradations) are diffracted by the FOFP cladding apertures 92 into the small light acceptance cone of the eye 96 or instrument resulting in significant degradation of on-axis contrast performance of the FOFP-coupled LCD.

Figure 14:
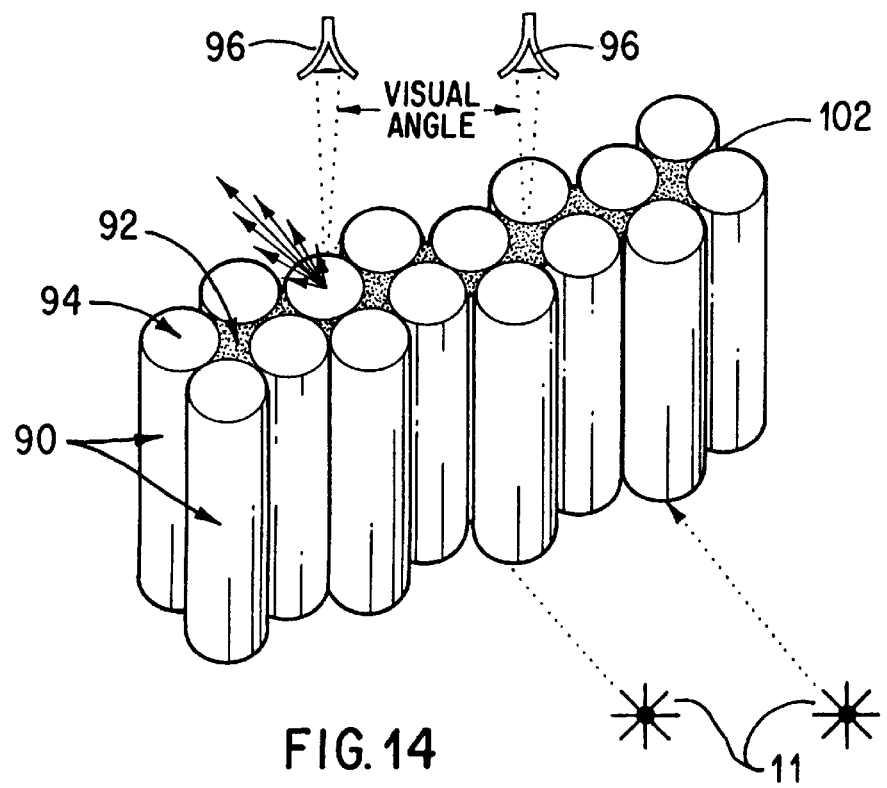
FIG. 14 illustrates the reduction in diffraction related contrast degradation in a fiber-optic faceplate according to the present invention.

The on-axis contrast performance of the FOFP-coupled LCD can be dramatically improved by masking the cladding apertures 92 of the FOFP as shown in FIG. 14. This figure illustrates a FOFP with masked cladding 102 and how such masking prevents the cladding apertures 92 from diffracting off-axis light into the observer's viewing cone. Evaluations of LCDs coupled to FOFPs with masked cladding apertures 102 have confirmed the effectiveness of this enhancement, resulting in dramatic improvements in the on-axis contrast performance of FOFP-coupled LCDs. These analyses and the resulting FOFPs with masked cladding apertures 102 provide significant enhancements to the invention disclosed in U.S. patent application Ser. No. 08/215,454, filed Mar. 21, 1994, the subject matter of which is incorporated herein by reference.

Figure 15:
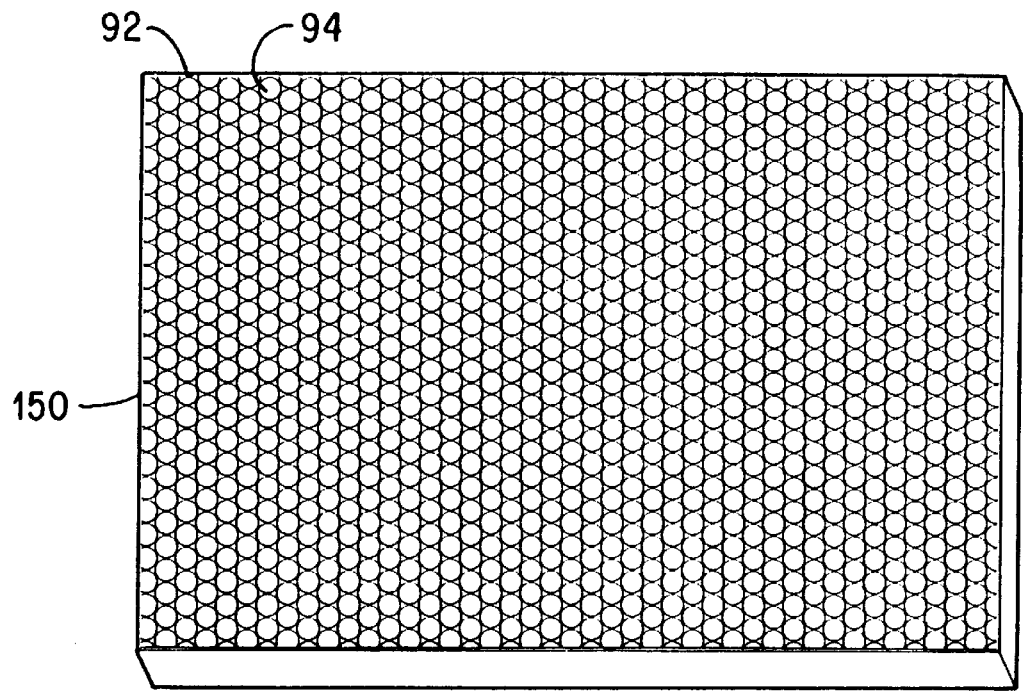
FIG. 15 is a fiber-optic faceplate having transparent cladding apertures.
Figure 16:
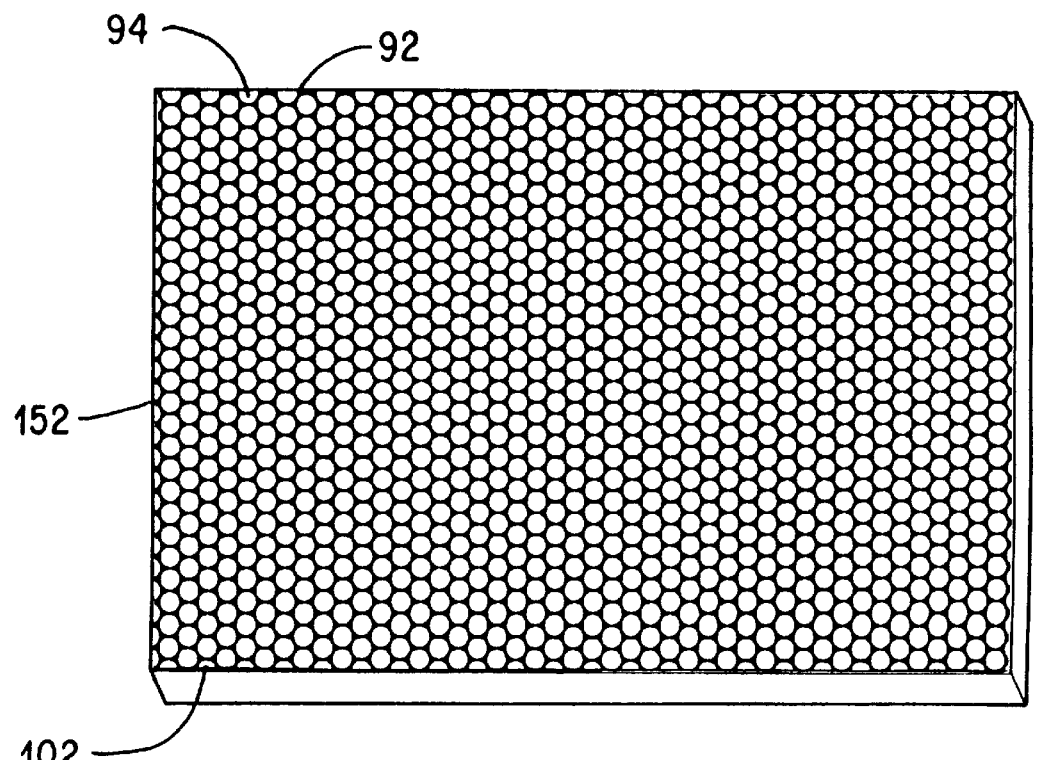
FIG. 16 is a fiber-optic faceplate having opaque cladding apertures.

FIG. 15 is a fused fiber-optic faceplate 150 having transparent cladding apertures 92. FIG. 16 is a fused fiber-optic faceplate 152 with the surface masked with opaque cladding apertures 102. This may be accomplished by coating the front of the FOFP with a blocking layer that covers only the cladding apertures 92 of the FOFP. This coating can be, for example, a metal-metal oxide anti-reflective coating applied over the FOFP and then patterned away over the fiber openings 94 while maintaining the opaque coating over the cladding apertures 92. The anti-reflective nature of the coating reduces ambient reflections from the FOFP. This blocks the diffracted light in the dark-state from high-luminance off-axis directions from coupling into the on-axis direction which greatly improves the on-axis and overall contrast ratio. These coating layers may be obtained from Nanostructures, Inc., located in Santa Clara, Calif. Other coating methods are also within the scope of this invention. For example, the fiber cores 90 and the cladding material may be made from chemically different materials. The FOFP can then be treated with gas to turn the cladding opaque.

As discussed above, off-axis light from the backlight 60 that traverses through a stack of passive and active optical elements that comprise a liquid crystal flat panel display results in diffraction after the light exits FOFP to degrade the contrast. Brightness-enhancing films (BEFs) and the use of a negative-retardation-film can also be used to alleviate and/or compensate off-axis light propagation, thereby reducing the amount of off-axis light diffracted by the FOFP and resulting in contrast enhancement.

A BEF film is typically located between a diffuser and a liquid crystal display panel. The BEF film is utilized to control the distribution of light from the back light assembly. Light emitted from the backlight assembly at large angles that cannot be used efficiently in the display is "folded" into smaller angles before traversing the liquid crystal display. This increases the display brightness and efficiency within the smaller useful viewing volume. This was demonstrated by Lu (SID 93 Digest, page 33). The BEF is conventionally used to enhance backlight brightness and prolong the life of the backlight since lower power is required for the same brightness levels. BEF films are commercially available from the 3M Company in St. Paul, Minn. BEF films may fold-back the off-axis light into on-axis light propagation as much as possible before it reaches the FOFP to limit the effects of diffraction.

Figure 17:
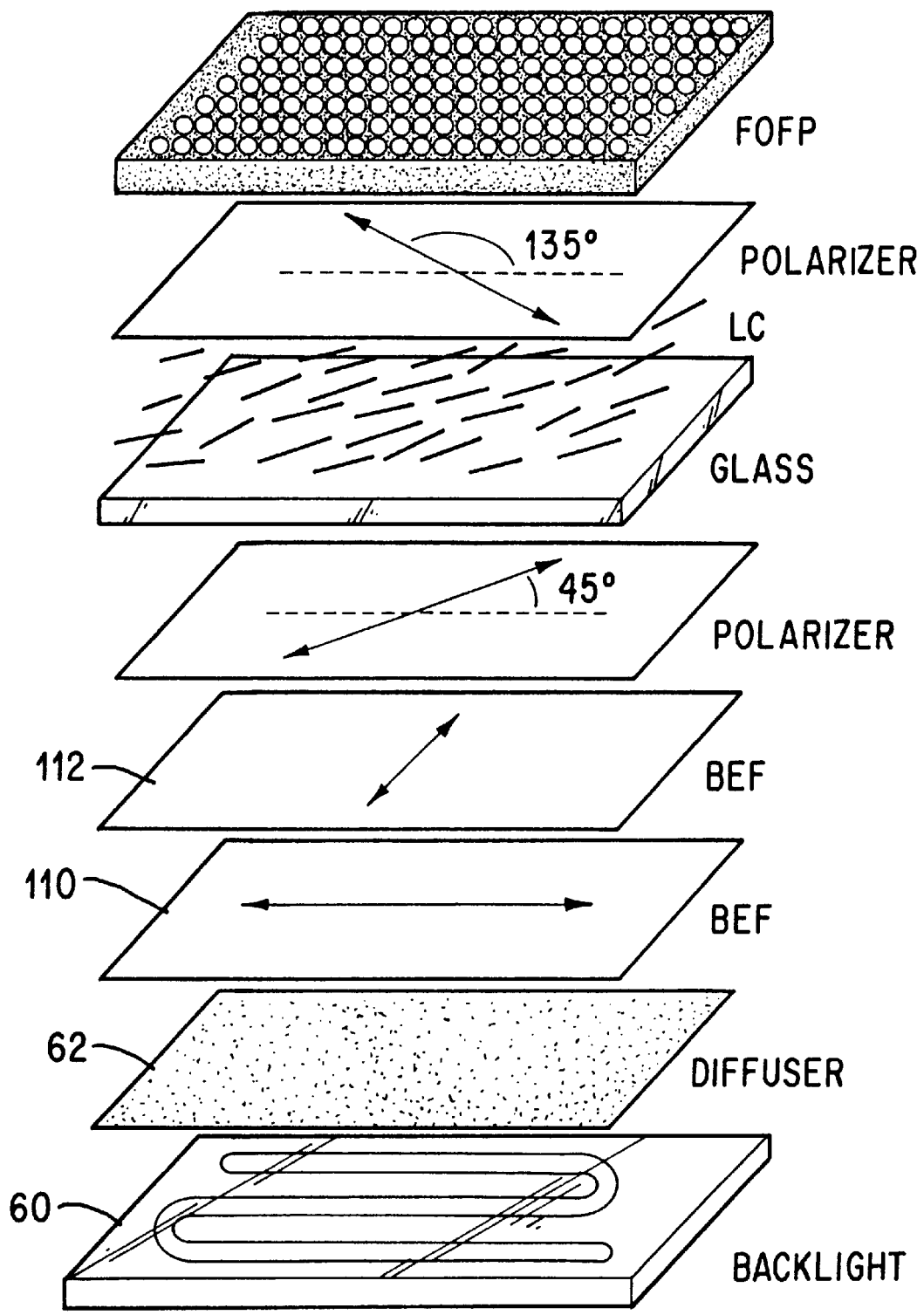
FIG. 17 shows a crossed BEF in conjunction with the FOFP in a LCD system.

FIG. 17 shows a complete stack of optical elements. The BEF films 110 and 112 are crossed after the diffuser 62 to fold in as much off-axis light as possible before the light reaches the first polarizer 114 oriented at 45°. FIG. 17 shows only one possible system configuration. The orientation of the BEFs, polarizers and liquid crystal material and surface parameters (i.e., pre-tilt and twist angle) can be configured differently to achieve the desired performance for specific display applications. The BEFs 110 and 112 can be oriented such that the incoming light can be 'funneled' into various parts of the display where contrast is higher and therefore more desirable. The same idea can be utilized with other brightness enhancing films (for example, the HaloBrite holographic diffusing film made by Kaiser Optical Systems, Inc. in Ann Arbor, Mich.) that are known as holographic diffuser films. These films can also be crossed to achieve similar performance. There are also some synergies between the BEFs and the holographic diffuser technology that enable them to be combined effectively in some applications.

Figure 18:
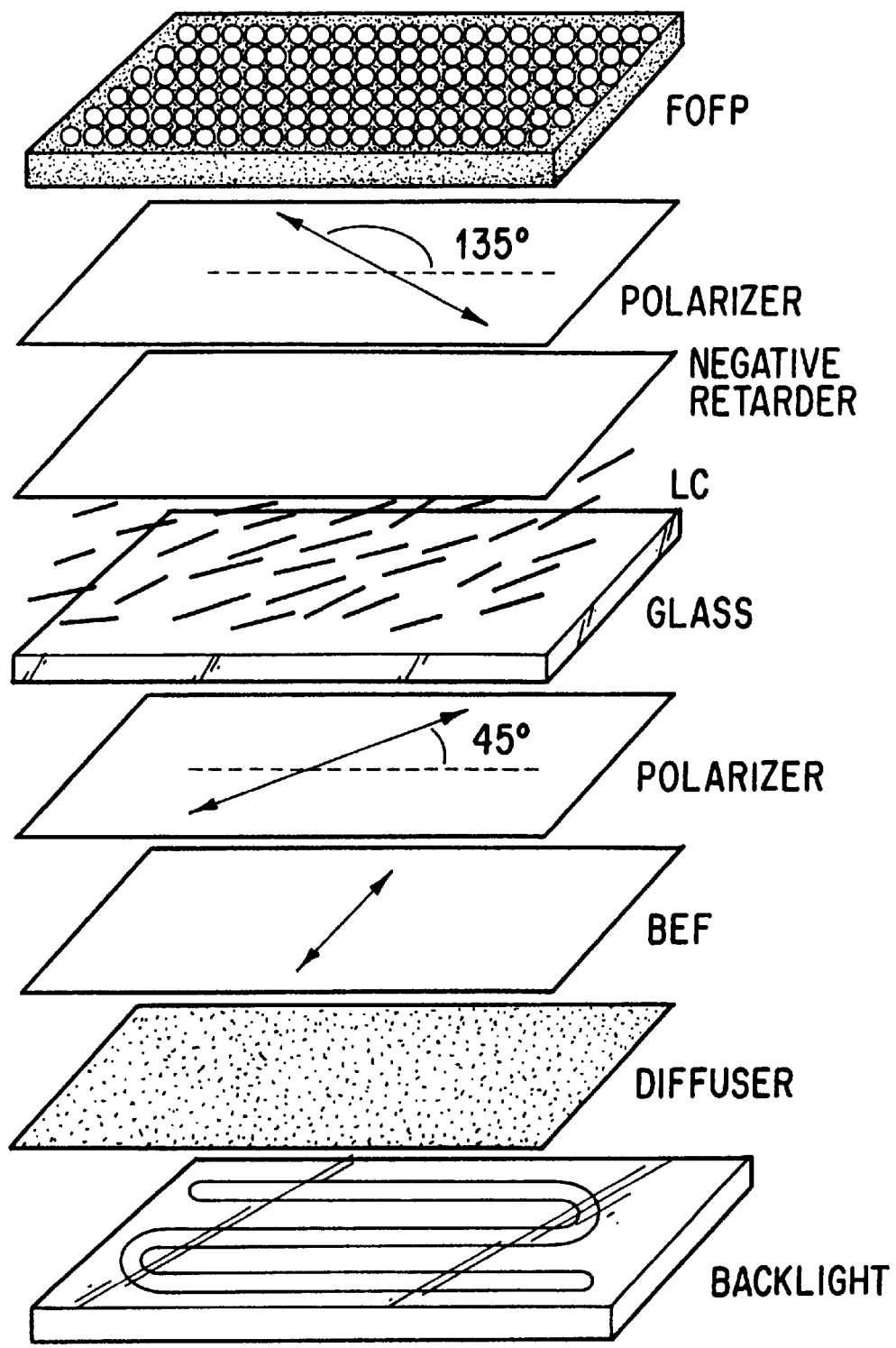
FIG. 18 shows a negative retarder used in conjunction with the FOFP in a LCD system.

To reduce off-axis light traversing through the FOFP and diffracting, another approach can be used to compensate the effects of off-axis light. As shown in FIG. 18, by placing a negative retarder between the liquid crystal layer and the second polarizer, the effects of off-axis light can be corrected. The optical path length of the negative retarder should be equal in magnitude but opposite in sign of the path length of the liquid crystal layer. The path length is defined as $\Delta nd/\gamma$ where $\Delta n$ is the index of refraction, d is the film thickness, and $\gamma$ is the wavelength of light traversing through the stack. When the liquid crystal cell is completely aligned by an applied voltage (homeotropic state), the off-axis light entering the liquid crystal cell is the most detrimental to contrast. The light in this state is decomposed into its ordinary ($n_o$) and extraordinary ($n_e$) components due to the birefringence of the liquid crystal. This light then 'leaks' out of the second polarizer thereby degrading the contrast. By compensating with a negative retardation film in the stack shown in FIG. 18, the ordinary and extraordinary light rays can be recombined before they reach the second polarizer. FIG. 18 only shows only one BEF film being utilized as an example. This is not the case for all applications; that is, some applications may require two or more BEFs or may not require any to improve optical performance. The holographic diffuser technology can also be implemented into the stack of optical elements in place of the diffuser and BEFs, or in conjunction with them. By minimizing the off-axis light leakage problem with the negative retardation film, we also lessen the effects of diffraction of the FOFP and improve the contrast of the display.

Figure 19:
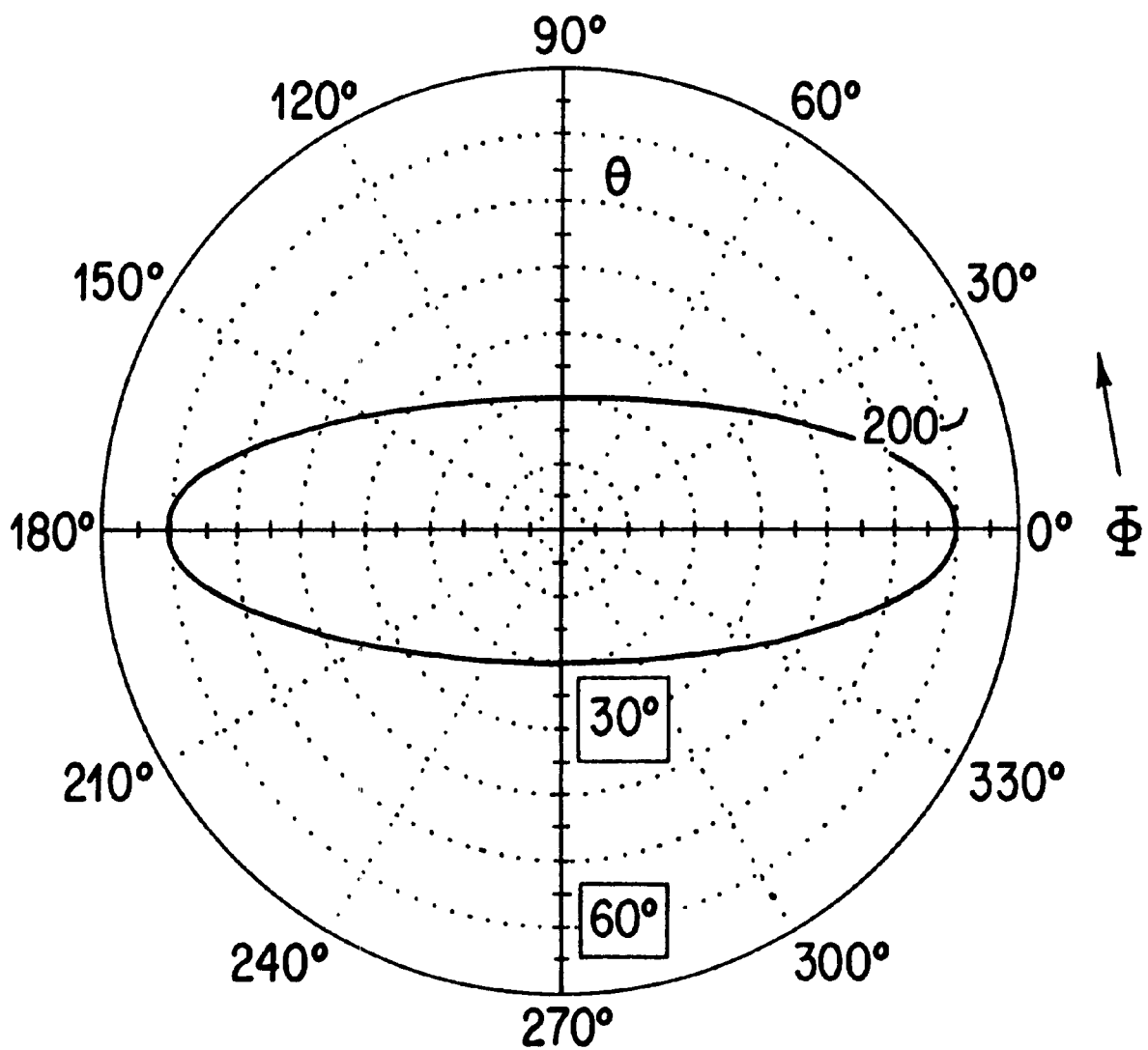
FIG. 19 is an example of an iso-contrast diagram for a liquid crystal display with a narrow viewing angle, but with uniformly high contrast.

The FOFP passive optical element is used as the last optical element in the liquid crystal display system to greatly improve the viewing angle characteristics of the liquid crystal display. The viewing angle characteristics are typically presented on polar diagrams, known as iso-contrast diagrams, in which curves of equal contrast ratio are presented. Implementing the FOFP into the stack of optical elements that comprise the liquid crystal display system results in an optimal isocontrast diagram (concentric circles centered on the origin). The azimuthal averaging effect of the FOFP corrects the poor viewing angle performance of the conventional liquid crystal display. See, for example, Terry Scheffer and Jurgen Nehring, "Twisted Nematic and Supertwisted Nematic Mode LCDs," in Liquid Crystals: Applications and Uses, edited by B. Bahadur, World Scientific, Singapore, 1990, the subject matter of which is incorporated herein by reference. By engineering a liquid crystal display cell that has a very narrow viewing angle and range, the FOFP element will completely correct the poor viewing angle performance of the cell due to its azimuthal averaging effect. See FIG. 19. By engineering a cell with a very limited viewing angle capability (which would have limited application as a stand alone display) and a region with uniformly high contrast as shown on the iso-contrast diagram in FIG. 19, the FOFP transforms the viewing angle characteristics of this cell to be perfectly symmetric (concentric circles centered on the origin). To improve the contrast dramatically, such a cell could be used in conjunction with the BEF or holographic diffuser films. For example, the BEF or holographic films could be used to channel most of the intensity of the backlight into the narrow viewing direction of the liquid crystal display, which is then sent through the FOFP for azimuthal averaging.

The optical characteristics of LCDs with bonded FOFPs or optical equivalents enable the production of wide, symmetric viewing angles with high intrinsic contrast. However, in many applications a wide viewing angle is not required and other features of the display are more important. For example, in the avionics environment, the ambient illumination can be very intense (i.e., greater than or equal to 10,000 fc) and any reflections from the display surfaces can produce significant reductions in display contrast. In addition, the emission or leakage of stray light from the display at large angles can be problematic in the avionics environment due to the reflections of that leakage from the many surfaces within the cockpit. This latter issue has resulted in very restricted use of normally-white (NW) mode twisted-nematic LCDs in avionics and other critical application environments despite the inherently high contrast, optical simplicity and relatively low cost. These problems are particularly serious in single-place military cockpits with bubble canopies since the illumination incident on the display can come from many directions and degrade display contrast, and the curved bubble canopy exacerbates the multiple reflections of stray or leakage emissions from the display. The use of an LCD coupled to a relatively thick FOFP with a high level of extramural absorption (EMA) can be very advantageous in avionics and other high illumination environments since the absorption of off-axis illumination by the EMA can be especially effective in: 1) minimizing contrast reductions by high levels of ambient illumination incident on the display surface; and 2) reducing display light leakage at oblique angles. The approach of using an LCD with an FOFP incorporating high levels of EMA can be combined with use of brightness enhancement films (BEFs) as discussed above, such as those manufactured by 3M Company, to provide high output luminance within a narrow cone around the normal to the display surface while providing a high resistance to ambient contrast reduction and low levels of stray light emission. In addition, since the FOFP effectively scrambles the polarization of light passing through it, the light coming out of an LCD with coupled FOFP will be largely unpolarized. This depolarization of light from the LCD can be advantageous in avionics and other outdoor display applications where observers routinely wear polarized sunglasses or goggles.

Another area in which an LCD with coupled FOFP can be uniquely advantageous is for applications requiring both horizontal and vertical display placements. Because standard LCDs provide angularly asymmetrical contrast and luminance performance, the same display can not be oriented both horizontally and vertically. Standard LCDs must be optimized and the LC orientation optimized for a particular viewing orientation. Since the LCD with coupled FOFP provides uniform and symmetrical contrast and luminance virtually independent of the orientation, the same display can be used in either a horizontal or vertical orientation with no loss in performance. This property would allow LCDs that can be physically rotated to accommodate either landscape or portrait page orientations, as has been done with several CRT-based workstation displays. In addition, the ability to use the FOFP-coupled LCDs in either orientation provides the highly significant cost advantage of interchangeable parts and common part numbers for LCDs with the same basic size and characteristics but which must be used in both horizontal and vertical orientations. This situation is common in avionics and other critical application environments.

Figure 20:
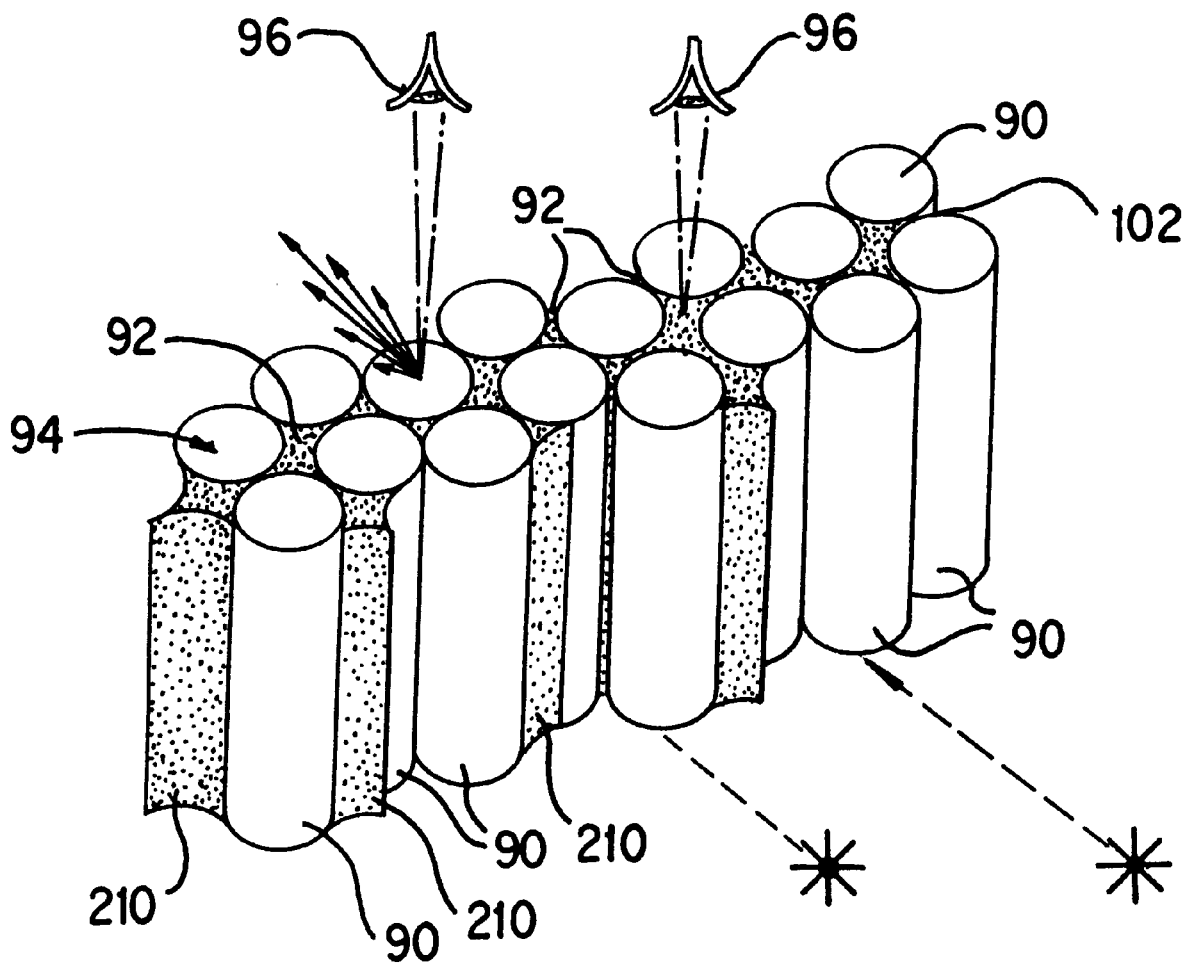
FIG. 20 is a fiber-optic faceplate having opaque cladding material.

An alternative method to improve on-axis contrast performance of the FOFP-coupled LCD is by making the cladding apertures 210 of the FOFP, as shown in FIG. 20, entirely opaque. This figure illustrates a FOFP with opaque cladding 210 and how such opaque cladding prevents the cladding apertures 92 from diffracting off-axis light into the observer's viewing cone. Evaluations of LCDs coupled to FOFPs with opaque cladding 210 have confirmed the effectiveness of this enhancement. Construction of a FOFP with opaque cladding can be accomplished by using opaque glass to form the cladding during construction of the FOFP.

The invention has been described with reference to the preferred embodiments thereof, which are illustrative and not limiting. Various changes may be made without departing from the spirit and scope of the invention as defined in the appended claims.

What is claimed is:

1. A direct-view, rear-illuminated liquid crystal display device, comprising in sequential order:
   a backlight source;
   a rear diffuser layer;
   a rear linear polarizer; and
   a liquid crystal cell including a rear glass layer with addressing elements and pixel ITO electrodes, a liquid crystal layer and a front fiber-optic faceplate as a front containing element substantially adjacent to said liquid crystal layer, said front fiber-optic faceplate including optical fibers and cladding material, said front fiber-optic faceplate having opaque cladding apertures on the front face, wherein only a front surface of the fiber cladding material is opaquely masked.

2. The direct-view liquid crystal display device of claim 1, further comprising a front polarizer adjacent to the front surface of said front fiber-optic faceplate.

3. The direct-view liquid crystal display device of claim 1, further comprising a front polarizer between the liquid crystal layer and the rear surface of the front fiber-optic faceplate.

4. The direct-view liquid crystal display device of claim 2, further comprising a first brightness-enhancing film located between the rear diffuser layer and the rear linear polarizer.

5. The direct-view liquid crystal display device of claim 4, further comprising a second brightness-enhancing film located between the first brightness-enhancing film and the rear linear polarizer.

6. The direct-view liquid crystal display device of claim 5, wherein said liquid crystal layer is aligned to produce a highly anisotropic light distribution possessing extremely high contrast around a narrow meridian of the display viewing volume.

7. The direct-view liquid crystal display device of claim 2, further comprising a negative retarder located between the liquid crystal layer and the front polarizer.

8. The direct-view liquid crystal display device of claim 1, wherein said liquid crystal layer is aligned to produce a highly anisotropic light distribution possessing extremely high contrast around a narrow meridian of the display viewing volume.

9. The direct-view liquid crystal display device of claim 1, wherein said liquid crystal layer is composed of twisted nematic material.

10. The direct-view liquid crystal display device of claim 1, wherein said liquid crystal layer is composed of super-twisted nematic material.

11. The direct-view liquid crystal display device of claim 1, wherein the opaque cladding apertures are formed by applying a light-blocking, anti-reflective coating over the front surface of the front fiber-optic faceplate and patterning away the light-blocking, anti-reflective coating from the core apertures.

* * * * *